United States Patent
Fouda

(10) Patent No.: US 12,541,690 B2
(45) Date of Patent: Feb. 3, 2026

(54) TRAINING OPTIMIZATION FOR LOW MEMORY FOOTPRINT

(71) Applicant: Rain Neuromorphics Inc., San Francisco, CA (US)

(72) Inventor: Mohammed Elneanaei Abdelmoneem Fouda, Irvine, CA (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

(21) Appl. No.: 18/742,948

(22) Filed: Jun. 13, 2024

(65) Prior Publication Data

US 2024/0419973 A1 Dec. 19, 2024

Related U.S. Application Data

(60) Provisional application No. 63/472,898, filed on Jun. 14, 2023.

(51) Int. Cl.
*G06N 3/084* (2023.01)
*G06N 3/048* (2023.01)

(52) U.S. Cl.
CPC .............. *G06N 3/084* (2013.01); *G06N 3/048* (2023.01)

(58) Field of Classification Search
CPC ........ G06N 3/084; G06N 3/048; G06N 3/045; G06N 3/063
See application file for complete search history.

(56) References Cited

U.S. PATENT DOCUMENTS

| | | |
|---|---|---|
| 11,347,477 B2 | 5/2022 | Sumbul |
| 11,475,300 B2 | 10/2022 | Yao |
| 2009/0177867 A1 | 7/2009 | Garde |
| 2010/0174883 A1 | 7/2010 | Lerner |
| 2015/0106311 A1 | 4/2015 | Birdwell |
| 2018/0189631 A1 | 7/2018 | Sumbul |
| 2019/0102170 A1 | 4/2019 | Chen |
| 2019/0102359 A1 | 4/2019 | Knag |
| 2019/0179795 A1 | 6/2019 | Huang |
| 2019/0205741 A1 | 7/2019 | Gupta |

(Continued)

FOREIGN PATENT DOCUMENTS

| | | |
|---|---|---|
| WO | 2020190776 | 9/2020 |
| WO | 2022029026 | 2/2022 |

OTHER PUBLICATIONS

Korthikanti et al., Reducing Activation Recomputation in Large Transformer Models, May 10, 2022, pp. 1-17.

(Continued)

*Primary Examiner* — Brent Johnston Hoover
(74) *Attorney, Agent, or Firm* — Finnegan, Henderson, Farabow, Garrett & Dunner, LLP

(57) ABSTRACT

A method is described. The method includes profiling a model for a learning network having a plurality of layers and associated memory. The layers include weight layers and activation layers. The plurality of weight layers including weights. The method also includes determining, based on the profiling, a training technique for the model on the learning network. The determination of the training technique includes optimizing a latency for at least one training iteration for a capacity of the associated memory. The training iteration(s) include at least one update of the weights for the weight layers.

20 Claims, 11 Drawing Sheets

(56) References Cited

U.S. PATENT DOCUMENTS

| | | |
|---|---|---|
| 2019/0340486 A1 | 11/2019 | Mills |
| 2019/0348110 A1 | 11/2019 | Sinangil |
| 2019/0362227 A1 | 11/2019 | Seshadri |
| 2020/0057938 A1 | 2/2020 | Lu |
| 2020/0207656 A1 | 7/2020 | Yoshioka |
| 2020/0293284 A1 | 9/2020 | Vantrease |
| 2020/0320403 A1 | 10/2020 | Daga |
| 2020/0410337 A1 | 12/2020 | Huang |
| 2021/0097431 A1 | 4/2021 | Olgiati |
| 2021/0158132 A1 | 5/2021 | Huynh |
| 2021/0224185 A1 | 7/2021 | Zhou |
| 2021/0343343 A1 | 11/2021 | Teague |
| 2022/0004497 A1 | 1/2022 | Willcock |
| 2022/0019880 A1* | 1/2022 | Dasgupta ................ G06N 3/04 |
| 2022/0114270 A1 | 4/2022 | Wang |
| 2022/0138286 A1 | 5/2022 | Zage |
| 2022/0164916 A1 | 5/2022 | Nurvitadhi |
| 2022/0207293 A1 | 6/2022 | Yao |
| 2022/0207656 A1 | 6/2022 | Yao |
| 2022/0244916 A1 | 8/2022 | Lee |
| 2022/0301605 A1 | 9/2022 | Mirhaj |
| 2022/0309328 A1 | 9/2022 | Saxena |
| 2022/0318610 A1 | 10/2022 | Seo |
| 2022/0414432 A1* | 12/2022 | Banitalebi Dehkordi .................. G06N 3/048 |
| 2023/0014565 A1 | 1/2023 | Ray |
| 2023/0045840 A1 | 2/2023 | Chih |
| 2023/0047364 A1 | 2/2023 | Badaroglu |
| 2023/0074229 A1 | 3/2023 | Jia |
| 2023/0138695 A1 | 5/2023 | Kumar |
| 2023/0146647 A1 | 5/2023 | Byeon |
| 2023/0206044 A1 | 6/2023 | Ma |
| 2023/0259456 A1 | 8/2023 | Verma |
| 2023/0297580 A1* | 9/2023 | Li .......................... G06N 3/096 706/25 |
| 2023/0316060 A1 | 10/2023 | Jain |
| 2023/0359894 A1 | 11/2023 | Kim |
| 2024/0094986 A1 | 3/2024 | Lyubomirsky |
| 2024/0134606 A1 | 4/2024 | Yi |
| 2024/0169201 A1 | 5/2024 | Seok |

OTHER PUBLICATIONS

Lee et al., A 12nm 121-TOPS/W 41.6-TOPS/mm2 All Digital Full Precision SRAM-based Compute-in-Memory with Configurable Bit-width for AI Edge Applications, 2022 Symposium on VLSI Technology & Circuits Digest of Technical Papers, pp. 24-25.

Chih et al., 16.4 an 89TOPS/W and 16.3TOPS/mm2 All-Digital SRAM-Based Full-Precision Compute-In Memory Macro in 22nm for Machine-Learning Edge Applications, In Proc. IEEE Int. Solid-State Circuits Conf.(ISSCC), vol. 64, 2021, pp. 252-254.

Li et al., A Precision-Scalable Energy-Efficient Bit-Split-and-Combination Vector Systolic Accelerator for NAS-Optimized DNNs on Edge, 2022 Design, Automation & Test in Europe Conference & Exhibition, 2022, pp. 730-735.

Mori et al., A 4nm 6163-TOPS/W/b 4790-TOPS/mm2/b SRAM Based Digital-Computing-in-Memory Macro Supporting Bit-Width Flexibility and Simultaneous MAC and Weight Update, In 2023 IEEE International Solid-State Circuits Conference (ISSCC), Feb. 2023, pp. 132-134.

Kim et al., MONETA: A Processing-In-Memory-Based Hardware Platform for the Hybrid Convolutional Spiking Neural Network with Online Learning, Frontiers in Neuroscience, vol. 16, Apr. 11, 2022.

Song et al., PipeLayer: a Pipelined ReRAM-Based Accelerator for Deep Learning, 2017.

Lin et al., A Novel Voltage-Accumulation Vector-Matrix Multiplication Architecture using Resistor-Shunted Floating Gate Flash Memory Device for Low-Power and High-Density Neural Network Applications, 2018 IEEE International Electron Devices Meeting (IEDM), Dec. 5, 2018, 4 pages.

* cited by examiner

TRAINING OPTIMIZATION FOR LOW MEMORY FOOTPRINT

CROSS REFERENCE TO OTHER APPLICATIONS

This application claims priority to U.S. Provisional Patent Application No. 63/472,898 entitled TRAINING GRAPH OPTIMIZATION FOR LOW MEMORY FOOTPRINT filed Jun. 14, 2023 which is incorporated herein by reference for all purposes.

BACKGROUND OF THE INVENTION

Learning networks (e.g. deep neural networks) typically include layers of weights interleaved with activation layers. A weight layer can be considered to multiply input signals (the "activation" for that weight layer) by the weights stored therein and provide corresponding output signals. For example, the weights may be analog resistances or stored digital values that are multiplied by the input current, voltage or bit signals. The output signals of a weight layer are input to the next activation layer, if any. Neurons in the activation layer apply some activation function to the weighted input signals and provide output signals corresponding to the statuses of the neurons. The output signals from the activation layer are provided as input signals (i.e. the activation) to the next weight layer, if any. This process may be repeated for the layers of the network. The structure of the network (e.g. the number of and connectivity between layers, the dimensionality of the layers, the type of activation function applied), including the value of the weights, is known as the model.

In order to utilize a learning network, the learning network is trained. Training determines the optimized values of the weights in each weight layer. Training thus provides parameters of the model. Supervised training may include performing inferences, determining a loss function, and updating the weights based on the loss function. The inference provides output signals for a given activation input to the learning network. Stated differently, the inference provides output signals based on the propagation of the initial input activation forward through the learning network. The loss function may be a measure of how different the output signals of the learning network are from the target outputs for the initial input activation. The loss function may be considered to be the difference between the final output signals and the target outputs. The weights in one or more weight layers are updated to improve the correlation between the output signals of the learning network and the target outputs (i.e. to reduce the loss function).

To determine the weight updates, techniques such as backpropagation may be used. Such techniques often involve propagating the loss function backwards through the learning network. Based on the propagation of the loss function backwards through the learning network and the input signals (activation) to a weight layer, the weight updates for the weight layer may be determined and applied to the weights in the weight layer. This process of inference, loss function determination, and weight update is repeated for multiple iterations until the loss function is sufficiently small and the output signals are sufficiently correlated to the target outputs.

Although training can result in a learning network capable of solving challenging problems, issues remain. Training may be time consuming. The latency, or time to perform an iteration of inference, loss function determination, and weight updates, is desired to be reduced. In addition, the learning network stores information during training. For example, the loss function and activations, the target outputs, and other information are stored at least temporarily. This information storage consumes memory. Particularly for edge devices using learning networks, storage of this information may consume an undesirably large amount of memory. In some cases, the available memory may be exhausted. Accordingly, what is desired are improved techniques for training of learning networks.

BRIEF DESCRIPTION OF THE DRAWINGS

Various embodiments of the invention are disclosed in the following detailed description and the accompanying drawings.

DETAILED DESCRIPTION

Figure 1:
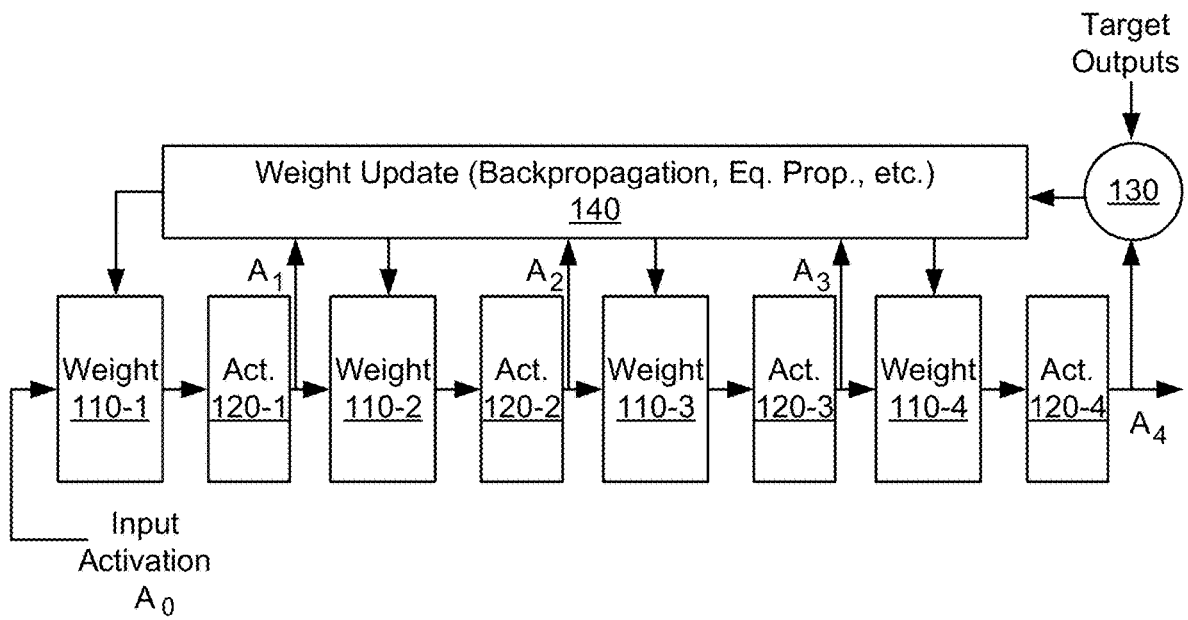
FIG. 1 depicts an embodiment of data flow in an embodiment of a learning network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Learning networks, such as deep neural networks, include weight layers interspersed with activation layers. The weights may be analog resistances or stored digital values that are multiplied by the input signals ("activation") such as current, voltage, or bit signals. The output signals of a weight layer may be input to the next activation layer, if any. The activation layer applies activation function(s), such as Tanh, ReLu, or SoftMax, and provides output signals corresponding to the statuses of the neurons. The output signals from the activation layer may be provided as the activation to the next weight layer, if any. The learning network (e.g. the number of and connectivity between layers, the dimensionality of the layers, the type of activation function applied) in combination with parameters such as the value of the weights, are known as the model.

The learning network is trained for use in particular tasks, such as image recognition or as a large language model. Training optimizes the values of the weights in each weight layer. Training thus provides parameters of the model. Training may include iteratively performing an inference, determining a loss function for the inference based on target outputs, and performing weight updates based on the loss function. Thus. weights in one or more weight layers are adjusted to improve the correlation between the output signals of the learning network and the target outputs.

Although training may prepare a learning network and model for use, improvements are desired. For example, learning networks may be desired to be used in edge devices (e.g. smart phones). Training of the learning network consumes both time and memory. In some instances, the latency (time taken to perform an iteration of training) and/or memory consumed during training may be larger than desired. For example, training may consume all of the available memory of the edge device or may require more memory than is available at the edge device. Consequently, improvements to training are desired.

A method is described. The method includes profiling a model for a learning network having a plurality of layers and associated memory. The layers include weight layers and activation layers. The plurality of weight layers including weights. The method also includes determining, based on the profiling, a training technique for the model on the learning network. The determination of the training technique includes optimizing a latency for at least one training iteration for a capacity of the associated memory. The training iteration(s) include at least one update of the weights for the weight layers.

In some embodiments, the profiling further includes performing a training iteration for the model using a particular training technique. The particular training technique may include at least one of backpropagation, activation recomputation, partial activation recomputation, or feedback alignment. Performing the training iteration may further include performing an inference using a training activation input, determining a loss function based on the inference, using the loss function to determine updates for the weights, and updating the weights. In some embodiments, using the loss function to update the weights includes backpropagating the loss function through the layers.

The capacity of the associated memory may be less than the memory required for the training iteration. In such cases, performing the training iteration may include loading, from a remote memory, an activation for a weight layer of the weight layers. Performing the training iteration may also include storing an output of the weight layer in the remote memory. The loading and storing may be repeated for each subsequent weight layer of the weight layers.

In some embodiments, profiling the model further includes determining descriptors for the model and, based on the plurality of descriptors, selecting the training technique from a library including a plurality of training techniques. In some cases, multiple training techniques may be selected. These training techniques may be combined or used for particular situations. In some embodiments, the descriptors include at least one of a batch size, a channel number, a width of an input activation, a height of the input activation, a stride, a padding size, a kernel size, a pooling size, or a dilation.

A system including a memory and a processor coupled to the memory is described. The processor is configured to profile a model for a learning network. The learning network has layers and associated memory. The layers include weight layers and activation layers. The weight layers include weights. The processor is also configured to determine, based on the profiling, a training technique for the model on the learning network. To determine the training technique, the processor is further configured to optimize a latency for at least one training iteration for a capacity of the associated memory. The training iteration(s) include update(s) of the weights for the weight layers.

In some embodiments, to profile the model, the processor is further configured to manage performing a training iteration for the model using a particular training technique. The particular training technique may include at least one of backpropagation, activation recomputation, partial activation recomputation, or feedback alignment. In some embodiments, performing the training iteration further includes the learning network performing an inference using a training activation input, determining a loss function based on the inference, using the loss function to determine updates for the weights, and updating the weights. Updating the weights may include backpropagating the loss function through the plurality of layers.

In some cases, the capacity of the associated memory is less than the memory required for the training iteration. In such cases, the learning network may be managed to performing the training iteration by loading, from a remote memory, an activation for a weight layer of the plurality of weight layers and storing output of the weight layer in the remote memory. This process of loading the activations and storing the outputs may be repeated for each subsequent weight layer.

In some embodiments, the learning network includes at least one tile. Each tile may include compute engines and a general-purpose (GP) processor coupled with the compute engines. Each of the compute engines may include a compute-in-memory (CIM) hardware module. The CIM hardware module stores at least a portion of the weights corresponding to a matrix and is configured to perform a vector-matrix multiplication (VMM) for the matrix. The compute engines correspond to the weight layers. The GP processor is coupled with the compute engines and is configured to provide control instructions and data to the compute engines. The general-purpose processor may also apply the activation functions. Thus, the GP processor may correspond to the activation layers. In some embodiments, the GP processor is coupled with the compute engines via a streaming port and a control port. The control port is configured to provide the compute engines with the control instructions. The streaming port is configured to exchange data between the GP processor and the compute engines. The CIM hardware module may include a plurality of storage cells for storing the plurality of weights.

A computer program product embodied in a non-transitory computer readable medium is described. The computer program product includes computer instructions for profiling a model for a learning network. The learning network includes layers and associated memory. The layers include weight layers and activation layers. The weight layers include weights. The computer program product also includes computer instructions for determining, based on the profiling, a training technique for the model on the learning network. The determination of the training technique includes optimizing a latency for at least one training iteration for a capacity of the associated memory. The training iteration(s) include at least one update of the weights for the weight layers.

FIG. 1 depicts an embodiment of data flow in learning network 100. Learning network 100 includes weight layers 110-1, 110-2, 110-3, and 110-4 (collectively or generically 110) and activation layers 120-1, 120-2, 120-3, and 120-4 (collectively or generically 120). Thus, learning network 100 includes four layers. Another number of layers may be present. Although weight layers 110 are shown as interleaved with activation layers 120, in some embodiments, additional layers (not shown) may be provided (e.g. between layer(s) 110 and 120) and/or one or more weight layer 110 or activation layer 120 may be omitted. In some embodiments, each weight layer 110 performs vector-matrix multiplication (VMM) of an input vector, or input activation ($A_0$), with a matrix of weights stored in weight layer 110. In some embodiments, weight layers 110 perform VMMs in hardware. For example, a hardware accelerator may be used to perform, in parallel, operations for a VMM of the input activation with the matrix of stored weights. Activation layers 120 may be used to apply activation function(s) to the weighted output signals of weight layers 110. For example, activation layers 120 may perform ReLu, SoftMax, and/or Tanh operations. Although depicted as layers in line with weight layers 110, activation layers 120 may be implemented using one or more processors. For example, the weighted output signals from weight layers 110 may be provided to a processor for application of the activation function. Although described in the context of single iterations for training and use, learning network 100 may operate in batch mode (i.e. on batches of data). Moreover, memory for learning network 100 is typically present, but not explicitly depicted in FIG. 1.

During use of learning network 100, an input vector, or input activation ($A_0$), is provided to weight layer 110-1. For example, the input activation may be RGB data for an image or other data desired to be operated on by learning network 100. A first weighted output is provided from weight layer 110-1 to activation layer 120-1. Activation layer 120-1 applies a first activation function to the first weighted output and provides a first activated output (i.e. a first activation-$A_1$) to weight layer 120-2. A second weighted output is provided from weight layer 110-2 to activation layer 120-2. Activation layer 120-2 applies a second activation function to the second weighted output and provides the second activated output (i.e. a second activation-$A_2$) to weight layer 110-3. A third weighted output is provided from weight layer 110-3 to activation layer 120-3. Activation layer 120-3 applies a third activation function to the third weighted output and provides a third activation ($A_3$) to weight layer 110-4. A fourth weighted output is provided from weight layer 110-4 to activation layer 120-4. Activation layer 120-4 applies a fourth activation function to the fourth weighted output and provides output signals ($A_4$) from learning network 100. This process of propagating the input activation through training network 100 may be considered an inference performed by learning network 100.

Prior to use, learning network 100 is desired to be trained. For training, loss function calculator 130 as well as weight update block 140 are used. Although shown as blocks, weight update block 140 and/or loss function calculator 130 may be provided in hardware and/or software. During training of learning network 100, the output signals ($A_4$) of learning network 100 are provided to loss calculator 130. The difference between the target output signals is determined by loss calculator 130. Using weight update technique(s) 140, the updates to weights in weight layers 110 are determined and the weights in weight layers 110 are updated. Weight update block 140 might utilize techniques including but not limited to backpropagation, equilibrium propagation, activation recomputation, partial activation recomputation, feedback alignment and/or some other technique (or combination thereof). This process may continue iteratively until the desired accuracy is achieved.

Figure 2:
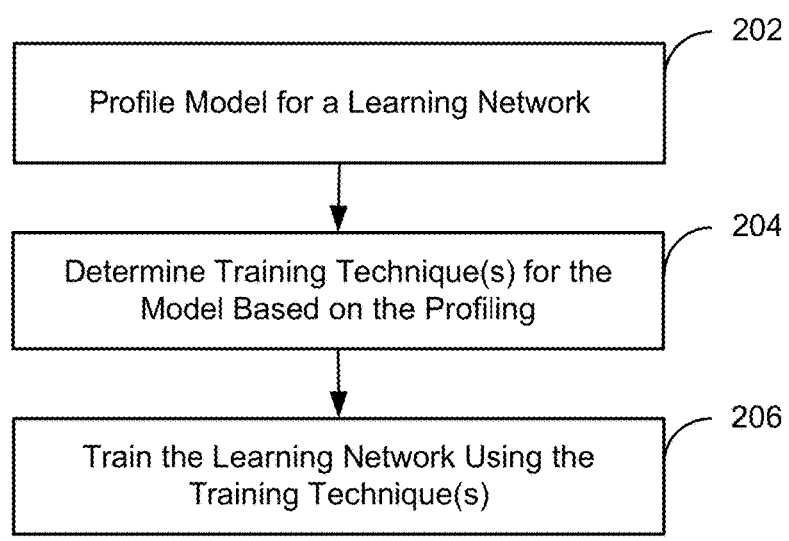
FIG. 2 is a flow chart depicting an embodiment of a method for training a learning network.

FIG. 2 is a flow chart depicting an embodiment of method 200 for training a learning network, such as learning network 100. However, method 200 is usable with other learning networks. Although particular processes are shown in an order, the processes may be performed in another order, including in parallel. Further, processes may have substeps. Method 200 may be used for a particular task and/or for a particular learning network. Thus, method 200 may be considered to be used for determining parameters of a model.

The model for a learning network is profiled, at 202. In some embodiments, 202 includes determining the latency, or time taken, for one or more iterations of one or more training techniques. Stated differently, 202 may be used to benchmark the performance of the learning network for the model. In some embodiments, 202 includes performing one or more training iterations for the model using particular training technique(s). For example, a model may have particular input activation(s) and target output(s) for the task (e.g. image recognition or text generation) for which the learning network is being trained. Profiling at 202 may include performing on the learning network one or more inferences for the particular input activation(s). The loss function(s) for the output signals may be calculated based on target outputs for the model. Using one or more training techniques, the updates to the weights are calculated and, in some embodiments, applied. Thus, a training iteration may include operations for both an inference (the forward path) and a weight update (the backward path). In some embodiments, a single iteration is used for profiling a particular training technique. In some embodiments, multiple iterations may be performed (e.g. until the training network is partially or completely trained). In some embodiments, a single batch may be used. In some embodiments, multiple batches may be used. The particular training technique may include one or more of backpropagation, activation recomputation, partial activation recomputation, equilibrium propagation, feedback alignment, another technique and/or a combination of techniques. In some embodiments, for example, backpropagation may be used. In such embodiments, the loss function is back propagated through the layers of the network and, using the activations for each layer and the propagated loss function, the weight updates may be determined. The time taken for this iteration and the memory used in storing the activations and propagated loss function for each weight layer may be determined. In some embodiments, other techniques are also used and the memory and latency determined.

In some embodiments, the capacity of the memory associated with the learning network may not be sufficient for the training technique used in 202. In such embodiments, a remote storage such as off-chip dynamic random access memory (DRAM) may be used to supplement the memory associated with the learning network. In such cases, performing the training iteration may include loading, from the remote memory, an activation for a weight layer of the weight layers. Performing the training iteration may also include storing an output of the weight layer in the remote memory. The loading and storing may be repeated for each subsequent weight layer of the weight layers.

The method also includes determining one or more training techniques for the model on the learning network, at 204. The determination of the training technique used is based on the profiling performed at 202. In some embodiments, 204 includes optimizing the latency for one or more training iterations for a given capacity of the associated memory for the learning network. The latency for a training iteration may be determined at 202. In some embodiments, the capacity used in 204 is the total memory present and/or available for the learning network. In some embodiments, the capacity of the associated memory used in 204 may differ. For example, some additional amount of the associated memory may be reserved for other uses. In such cases the capacity used in 204 is less than the available associated memory. In some embodiments, other memory that may be accessible by the learning network may be included in the capacity. In such cases the capacity used in 204 is greater than the available associated memory. In some embodiments, the optimization is performed, for example on a processor associated with or part of the learning network.

The method also includes determining one or more training techniques for the model on the learning network, at 204. The determination of the training technique used is based on the profiling performed at 202. In some embodiments, 204 includes optimizing the latency for one or more training iterations for a given capacity of the associated memory for the learning network. The latency for a training iteration may be determined at 202. In some embodiments, the capacity used in 204 is the total memory present and/or available for the learning network. In some embodiments, the capacity of the associated memory used in 204 may differ. For example, some additional amount of the associated memory may be reserved for other uses. In such cases the capacity used I 204 is less than the available associated memory. In some embodiments, other memory that may be accessible by the learning network may be included in the capacity. In such cases the capacity used I 204 is greater than the available associated memory. In some embodiments, the optimization is performed, for example on a processor associated with or part of the learning network.

In some embodiments, the optimization need not be performed as part of 204. For example, method 200 may have been performed a sufficient number of times for the same learning network, a sufficient number of times for analogous learning networks, for the same task, and/or for similar tasks that the descriptors of the model determined in 202 may be used to select the training techniques at 204. In some embodiments, 202 may include selecting training technique(s), based on the descriptors, from a library including multiple training techniques usable with the learning network. In some embodiments, 204 includes selection of multiple training techniques and combining the training techniques into a hybrid technique(s). In some embodiments, the training technique(s) selected may include one or more of backpropagation, activation recomputation, partial activation recomputation, equilibrium propagation, feedback alignment, another technique and/or a combination of techniques.

Once the training technique(s) have been selected, the learning network may be trained, at 206. Thus, the parameters for the model, such as the optimized weights, may be determined. The learning network may then be used for the desired functions.

For example, method 200 may be used in connection with learning network 100. At 202, the model for learning network 100 is profiled. For example, at 202 a training inference may be performed for learning network 100 using the target outputs and input activation ($A_0$). Using loss calculator 130, the loss function may be determined based on the target outputs and the output signals ($A_4$). The loss function may be provided to weight update block 140 to determine the weight updates. In this example, suppose the training technique used for 202 is backpropagation. To determine the weight updates, weight update block 140 uses the back propagated loss and the activations, $A_0$, $A_1$, $A_2$, and $A_3$. In some embodiments, the weights for layers 110 are also updated as part of 202. The latency for the training iteration may thus be determined. In some embodiments, the latency is determined as a function of the memory used for storing the activations ($A_0$, $A_1$, $A_2$, and $A_3$), the target outputs, the loss function, and the back propagated loss function. In some embodiments, 202 includes repeating the inference, loss calculation, weight update determination and weight update for other training techniques. The latency and memory used for such techniques may also be determined. 202 may be considered to profile the model for learning network 100 because the latency and/or memory for training the learning network for tasks indicated by the input activation and target outputs (i.e. training to optimize the weights/parameters for the tasks) may be determined.

At 204, the training technique(s) to be used in training learning network 100 are identified or selected. For example, the latencies determined at 202 may be optimized for a given capacity of the memory associated with learning network 100 for various training techniques. In some embodiments, multiple techniques may be selected (e.g. for combination and/or for performing portions of training for learning network 100). At 206, learning network 100 may be trained using the selected techniques.

Using method 200, training of learning networks may be improved. Because of the profiling and determination of the training techniques at 204, the training may be accomplished in a more efficient manner. For example, the combination of a reduced time to train and an appropriate amount of memory used in training may be achieved. In the example of learning network 100 having only four layers, method 200 may not be necessary as a memory intensive training technique may not exhaust the available capacity of the associated memory. However, for edge devices using a learning network with a large number of layers, determining the characteristics of the model (e.g. the dimension, latency, number of layers, and memory used) and identifying training technique(s) based on the model may greatly improve training.

Figure 5:
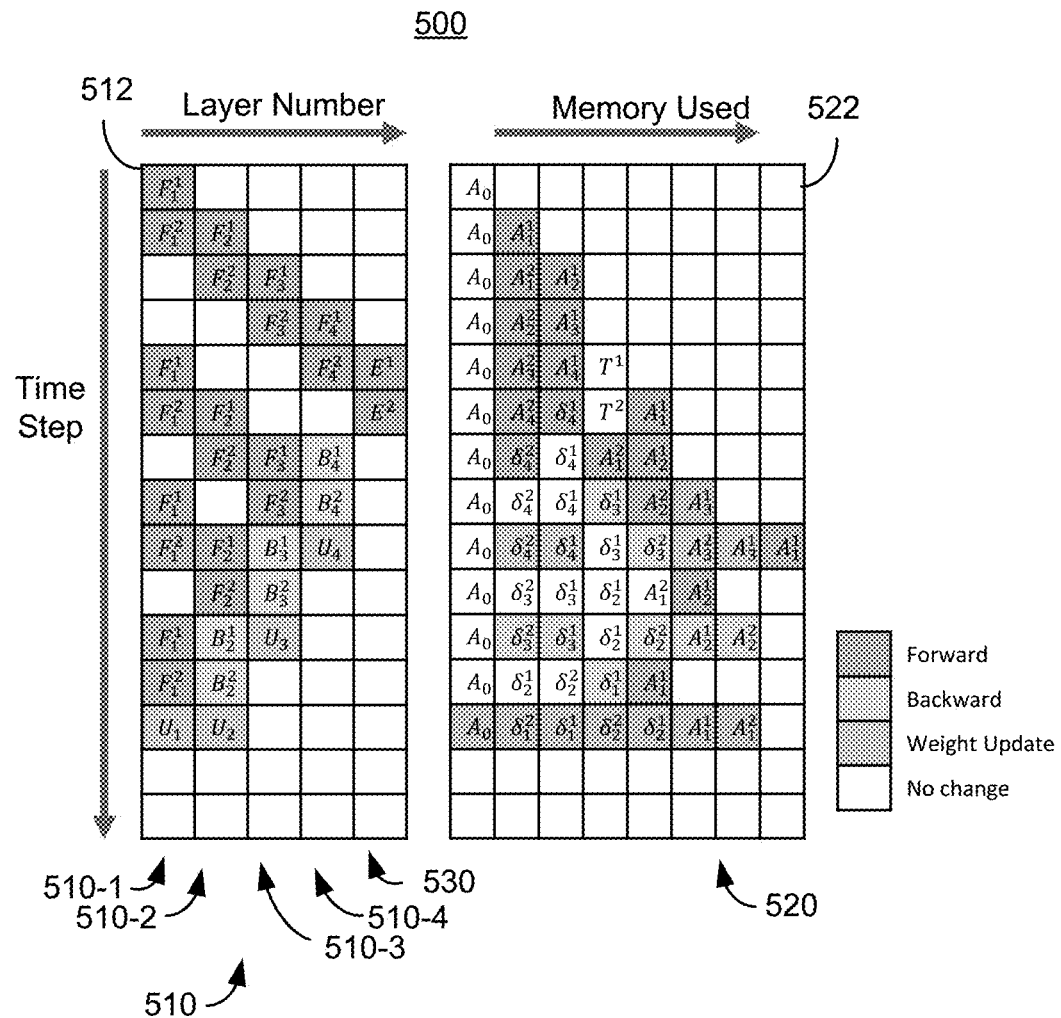
Figure 6:
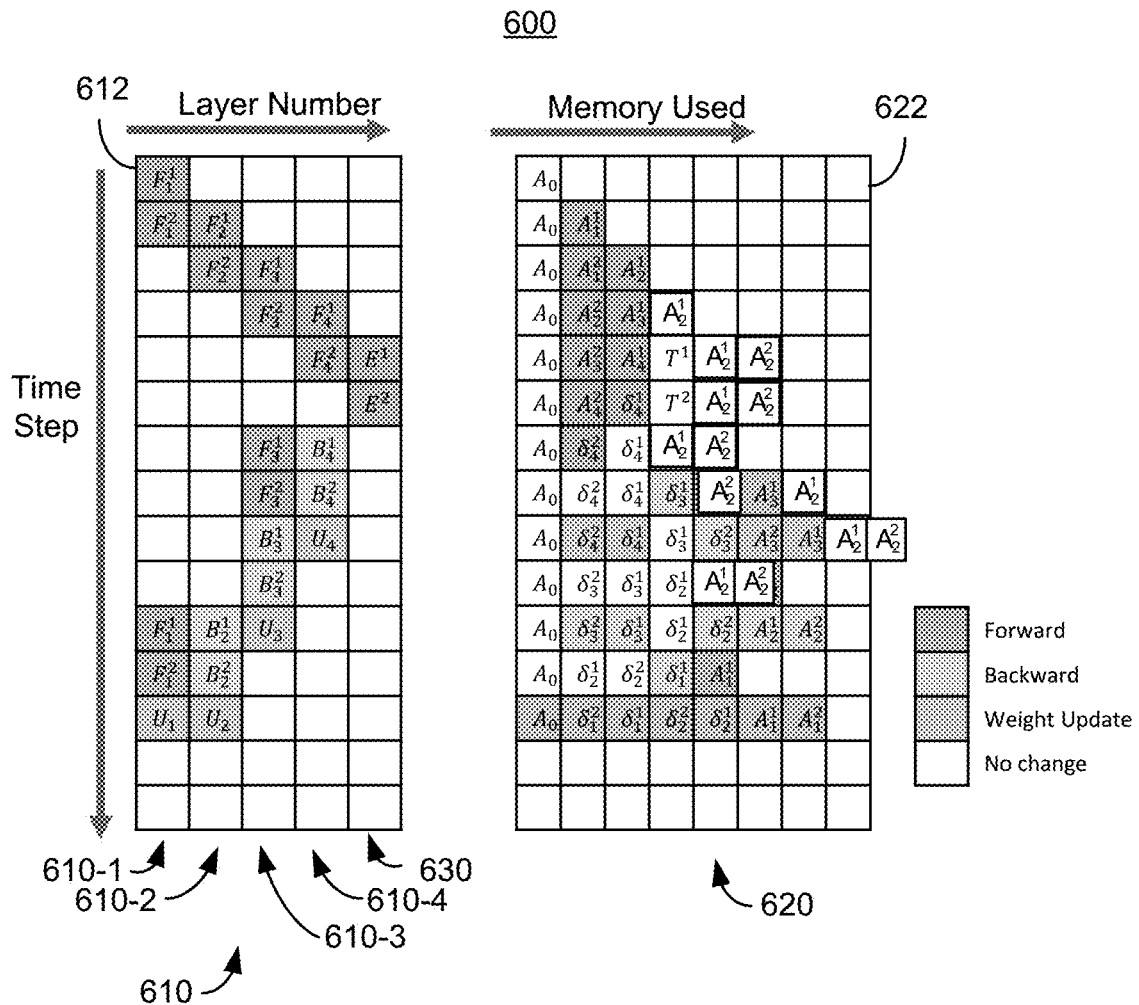
Figure 7:
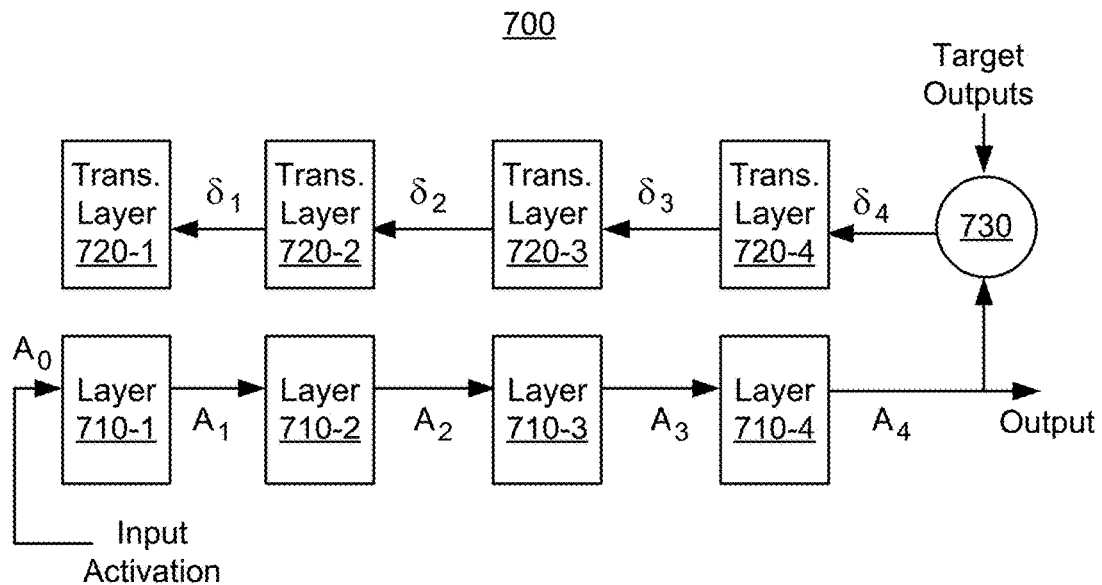
Figure 8:
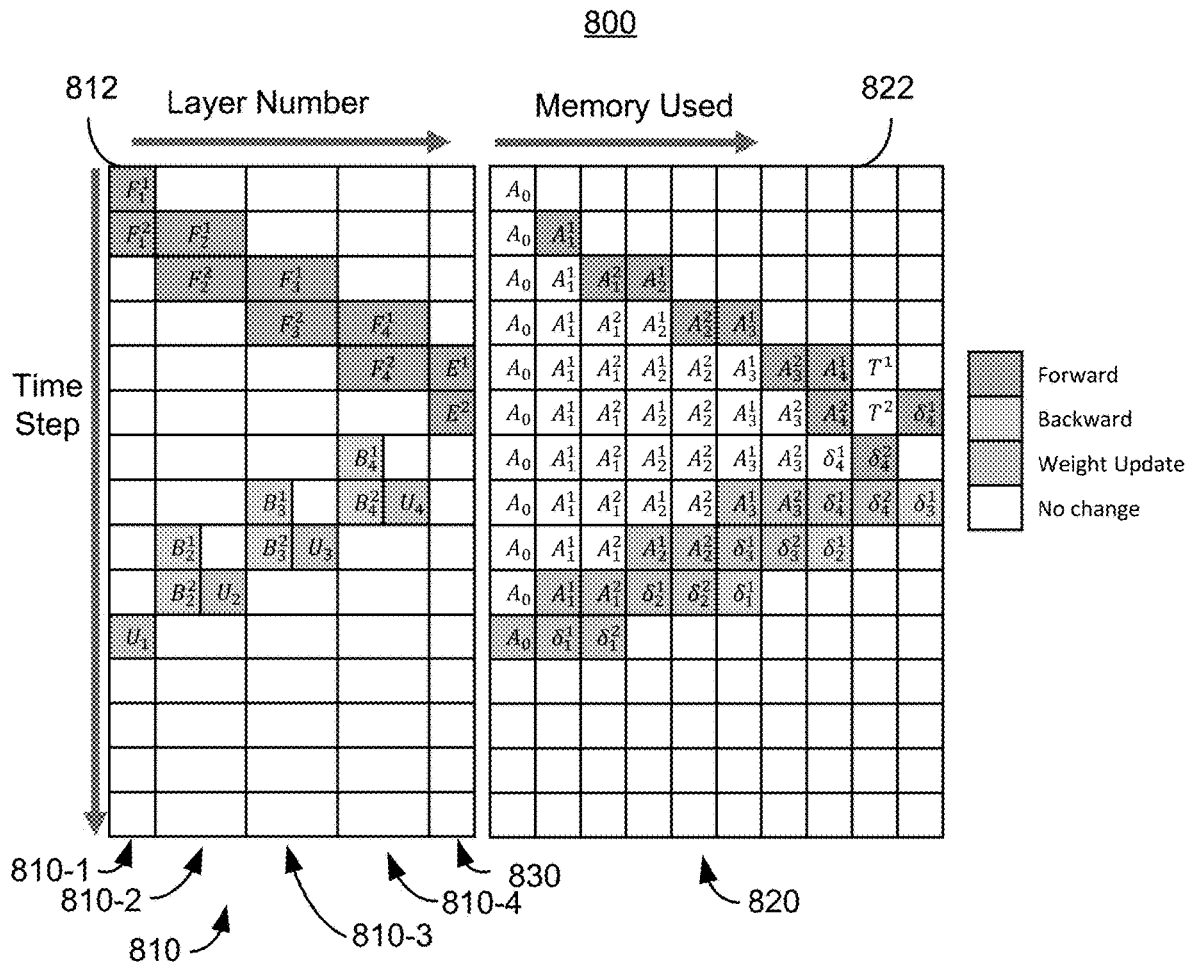
Figures 9, 10:
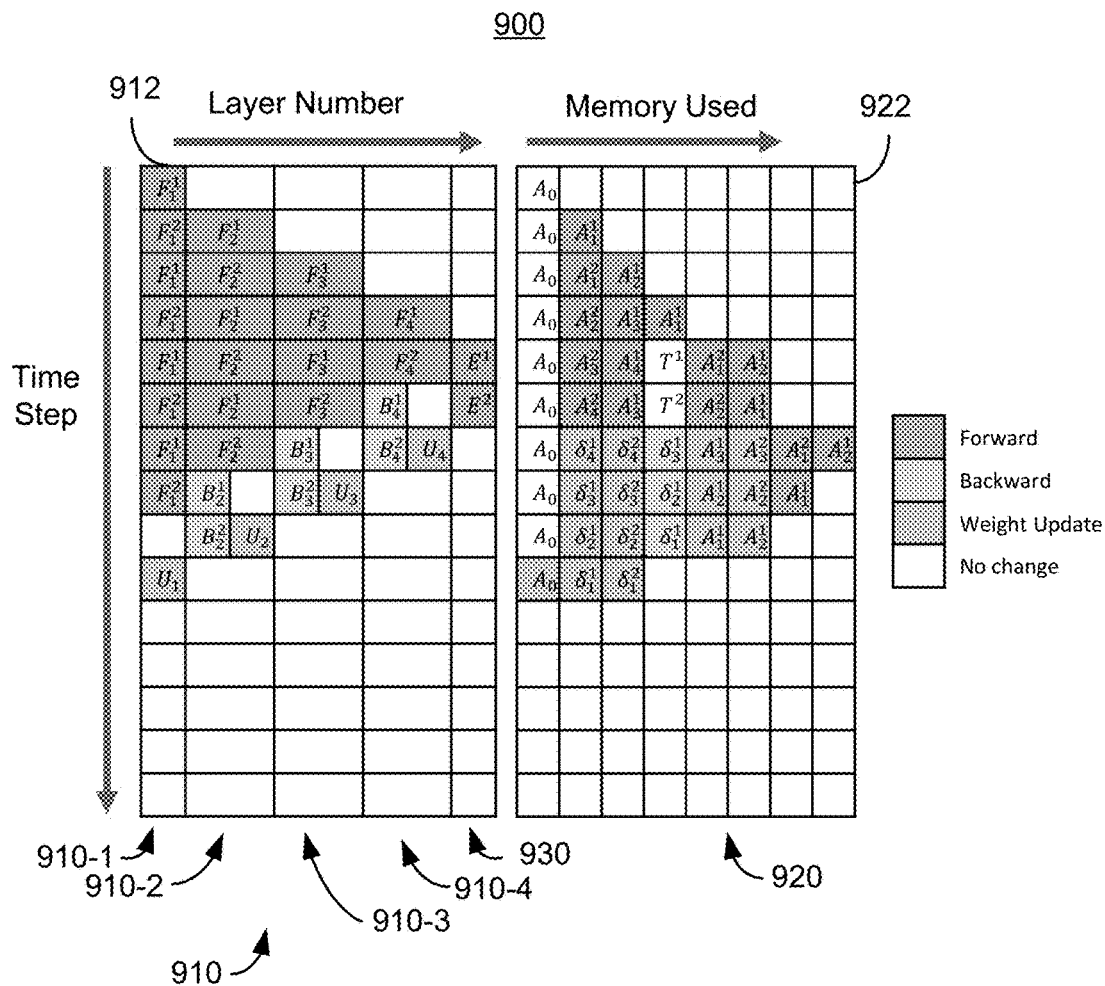
FIG. 10 is a table depicting embodiments of memory requirements for various learning network layers.

For example, FIGS. 3-9 depict embodiments of how profiling of a model may indicate different latencies and memory usage for training of learning network. Thus, method 200 may be used for the learning networks described by FIGS. 3-9. FIGS. 3-6 depict embodiments of how profiling of a model indicates the memory usage and latencies for backpropagation and forms of activation recomputation for a learning network having four layers. FIGS. 7-9 depict embodiments of how profiling of a model indicates the memory usage and latencies for feedback alignment and forms of activation recomputation for a learning network.

Figure 3:
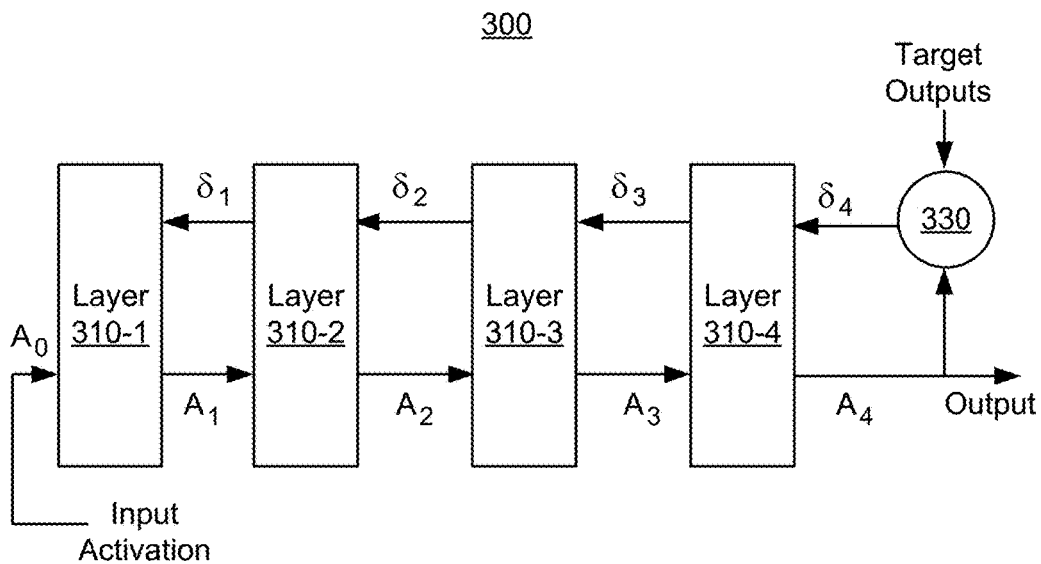
FIGS. 3-9 depict embodiments of how profiling of a model may indicate different latencies and memory usage for training of learning network.
Figure 4:
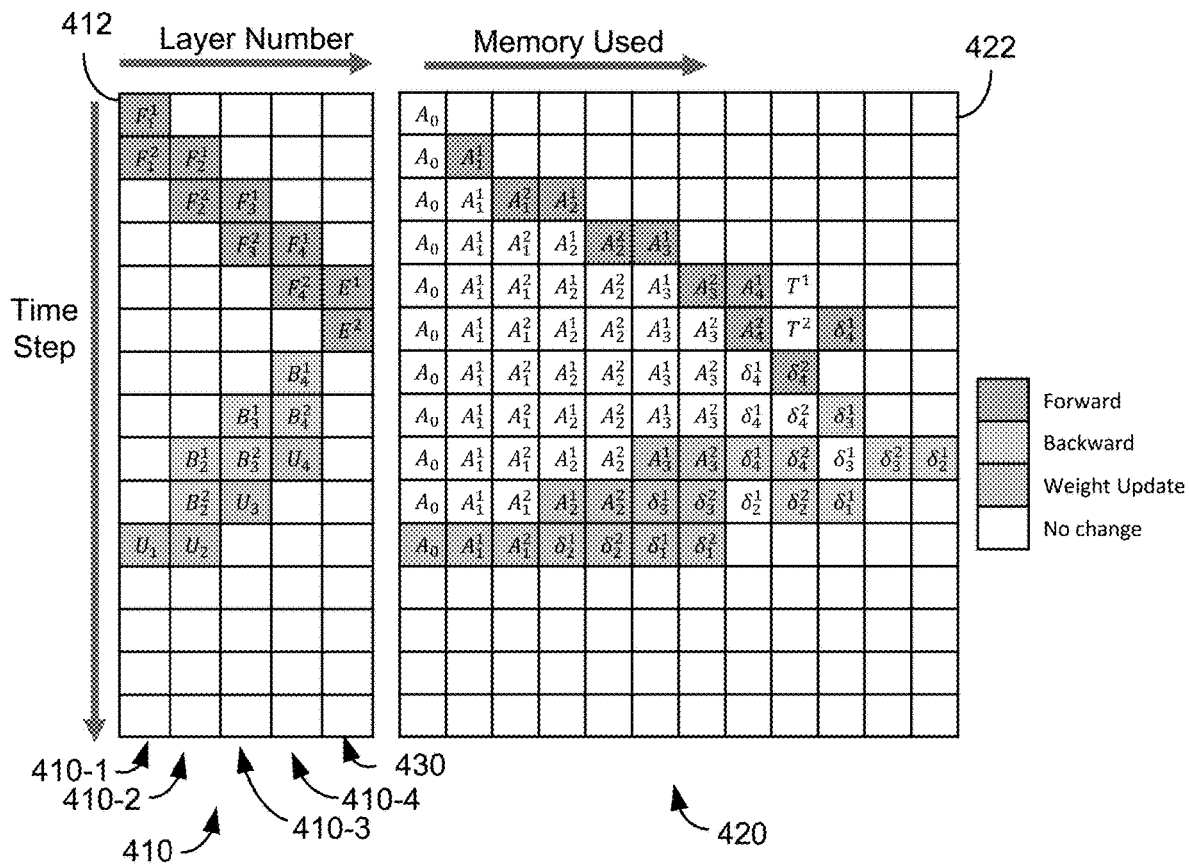

FIG. 3 depicts an embodiment of data flow in learning network 300. Learning network 300 includes layers 310-1, 310-2, 310-3, and 310-4 (collectively or generically 310) and loss calculator 330. Each layer 310 may be considered to include a weight layer and a corresponding activation layer. For example, layer 310-1 may be analogous to weight layer 110-1 in combination with activation layer 120-1. Thus, learning network 300 includes four layers. Another number of layers may be present. Moreover, memory for learning network 300 is typically present, but not explicitly depicted in FIG. 3. However, the associated memory is shown in FIGS. 4-6. FIG. 3 indicates that backpropagation is used. Thus, activations ($A_i$, where i=1, 2, 3, or 4) are shown as being output from particular layers 310 in the forward direction (i.e. from the input activation to the output). Input activation $A_0$ is provided to the first layer. The backpropagated loss function ($\delta_i$, where i=1, 2, 3, or 4) is shown as propagating in the backward direction (i.e. from loss calculator 330 to the first layer 310-1). The weight update for a corresponding layer is the outer product of the activation with the transpose of the backpropagated loss function ($\Delta W_i = A_i \odot \delta_i^T$).

FIG. 4 is a graph 400 that indicates the latency and memory usage of a training iteration using backpropagation as the training technique for learning network 300. Graph 400 includes layers 410 and memory 420. Layers 410-1, 410-2, 410-3, and 410-4 (collectively or generically 410) correspond to layers 310-1, 310-2, 310-3, and 310-4. Layer 430 corresponds to loss calculator 330. Each cell 412 (only one of which is labeled) of layers 410 indicates whether the corresponding layer is used for the time interval. Memory 420 is used in conjunction with learning network 300. Memory 420 includes memory cells 422 that correspond to one or more memory locations in which data are stored. In addition, FIG. 4 indicates that two batches are being used for the training iteration. For layers 410: $F_i^j$ indicates forward propagation (for an inference) through the $i^{th}$ layer for the $j^{th}$ batch; $B_i^j$ indicates propagation backward (for backpropagation/a weight update) through the $i^{th}$ layer for the $j^{th}$ batch; $U_i^j$ indicates an update of the weights in the $i^{th}$ layer for the $j^{th}$ batch; and $E^j$ indicates a calculation of the loss function for the $j^{th}$ batch. In memory 420, $A_i^j$ indicates storage of the activation for the $i^{th}$ layer and the $j^{th}$ batch; & indicates storage of the backward propagated loss for the $i^{th}$ layer and the $j^{th}$ batch; $T^j$ indicates storage of the target outputs for the $j^{th}$ batch.

At the first time step, only first layer 410-1 processes data for the first batch in the forward/inference path. This is shown by $F_1^1$ in layer 410-1. The input activation, $A_0$, is the only activation stored in cell 422 of memory 420 at this time step. At the second time step, second layer 420-1 processes data for the first batch. In addition, pipelining may be used in learning network 300. Thus, first layer 410-1 also processes data in the forward/inference path for the second batch. This is shown by $F_2^1$ in cell 412 for layer 410-2 and $F_1^2$ in cell 412 for layer 410-1. In addition, both the input activation A and activation from first layer 410-1, $A_1$, are stored in cell 422 of memory 420. This process continues through the four layers 410 and the first four time steps. At the fifth time step, fourth layer 410-4 processes data in the forward/inference path for the second batch. In addition, loss calculator 430 determines the loss function for the first batch. This is indicated by $F_4^2$ and $E^1$ at the fifth time step in layers 410. To determine the loss function, the target outputs for the first batch are used. Thus, memory 420 indicates that all of the activations for both batches ($A_1^1$, $A_2^1$, $A_3^1$, $A_4^1$, $A_1^2$, $A_2^2$, $A_3^2$, $A_4^2$) and the target outputs ($T^1$) for the first batch are stored and used. At the next time step, the loss function for the second batch is determined at $E^2$. To do so, the target outputs ($T^2$) for the second batch are stored and used. The backpropagated loss for the first batch, 841, determined in the prior step is also stored. Backpropagation may be commenced. Thus, fourth layer 410-4 determines the weight update for layer 410-4 and back propagates the loss for the first batch. This is indicated by $B_4^1$ in layers 410 and the storage of $\delta_4^2$ in the corresponding time step of $\delta_4^2$. In addition, the target outputs have been removed from storage to optimize the amount of memory used. In the subsequent time steps, the loss function for the first and second batches are backpropagated through layers 410 of learning network and the weights of the layers updated. As can be seen in FIG. 4, the amount of memory used (e.g. in the ninth time step) is significant. However, the latency is relatively low.

FIG. 5 is a graph 500 that indicates the latency and memory usage of a training iteration using backpropagation in combination with activation recomputation for the training technique for learning network 300. Graph 500 includes layers 510 and memory 520. Layers 510-1, 510-2, 510-3, and 510-4 (collectively or generically layers 510) correspond to layers 310-1, 310-2, 310-3, and 310-4. Layer 530 corresponds to loss calculator 330. Each cell 512 of layers 510, of which only one is labeled, indicates whether the corresponding layer is used for the time interval. Memory 520 is used in conjunction with learning network 300. Memory 520 includes memory cells 522 that correspond to one or more memory locations in which data are stored. In addition, FIG. 5 indicates that two batches are being used for the training iteration. For graph 500: $F_i^j$; $B_i^j$; $U_i^j$; $E^j$; $A_i^j$; $\delta_i^j$; and $T^j$ refer to analogous operations and stored quantities as in FIG. 4. For activation recomputation, only the input activations ($A_0$) are stored throughout the training iteration. The remaining activations are computed once in the forward pass and recomputed as necessary for backpropagation.

The first and second time steps for graph 500 are analogous to those for graph 400. At the third time step, however, $A_1^1$, which is not being used, is removed. Only $A_0$, $A_2^1$, and $A_1^2$ are stored. Only activations that are currently being used or will be used in the next step are stored. This process of discarding unused activations continues. In the fifth time step, at $E^1$, error calculator 530 determines the loss function using the activation $A_4^1$ and the stored target outputs, $T_1$, for the first batch. In addition, in order to prepare for backpropagation for the first batch, the input activation for the first batch is re-propagated through first layer 510-1. This is indicated at first layer 510-1 by $F_1^1$. The second batch is also propagated through the fourth layer at $F_4^2$. In the sixth time step, the loss function is determined for the second batch and the second batch starts re-propagating in the forward path to provide the data for backpropagation of the second batch. The process of re-propagating forward to obtain the appropriate activations for the batches and discarding activations that are not needed continues. Further, the weights are updated. A comparison of graphs 400 and 500 indicates that the training technique used in graph 500 (backpropagation combined with activation recomputation) requires less memory, but has a longer latency than backpropagation alone.

FIG. 6 is a graph 600 that indicates the latency and memory usage of a training iteration using backpropagation in combination with partial activation recomputation for the training technique for learning network 300. Graph 600 includes layers 610 and memory 620. Layers 610-1, 610-2, 610-3, and 610-4 (collectively or generically layers 610) correspond to layers 310-1, 310-2, 310-3, and 310-4. Layer 630 corresponds to loss calculator 330. Each cell 612 of layers 610, of which only one is labeled, indicates whether the corresponding layer is used for the time interval. Memory 620 is used in conjunction with learning network 300. Memory 620 includes memory cells 622 that correspond to one or more memory locations in which data are stored. In addition, FIG. 6 indicates that two batches are being used for the training iteration. For graph 600: $F_i^j$; $B_i^j$; $U_i^j$; $E^j$; $A_i^j$; $\delta_i^j$; and $T^j$ refer to analogous operations and stored quantities as in FIGS. 4 and 5. For partial activation recomputation, only the input activations ($A_0$) and selected other activations are stored throughout the training iteration. In the embodiment shown, $A_2^1$ and $A_2^2$ are stored until they are no longer needed. The remaining activations are computed once in the forward pass and recomputed as necessary for backpropagation.

The first and second time steps for graph 600 are analogous to those for graph 400. At the third time step, however, $A_1^1$, which is not being used, is removed. Only $A_0$, $A_2^1$, and $A_1^2$ are stored. Except for $A_0$, $A_2^1$, and $A_2^2$, this process of discarding unused activations continues. In the fifth time step, at $E^1$, error calculator 630 determines the loss function using the activation $A_4^1$ and the stored target outputs, $T_1$, for the first batch. The second batch is also propagated through the fourth layer at $F_4^2$. In the sixth time step, the loss function is determined for the second batch. In the seventh time step, at $F_3^1$, stored $A_2^1$ is re-propagated forward to determine $A_3^1$. The loss function for the first batch is also back propagated through layer 610-4. Similarly, in the eighth time step, stored $A_2^2$ is re-propagated forward to determine $A_3^2$. The loss function for the second batch is also back propagated through layer 610-4. The process of propagating forward to obtain the appropriate activations for the batches, storing $A_2^1$ and $A_2^2$ until they will not be needed again for the iteration, and discarding activations that are not needed continues. The weights are also updated. A comparison of graphs 500 and 600 indicates that the training technique used in graph 600 (backpropagation combined with partial activation recomputation) requires more memory than activation recomputation, but has a shorter latency than activation recomputation. A comparison of graphs 400 and 600 indicates that the technique used in graph 600 has a longer latency and uses less memory than backpropagation alone.

Thus, graphs 400, 500, and 600 indicate the tradeoffs between latency, computation intensity, and memory usage. In method 200, the training techniques of graphs 400, 500, and 600 may be profiled. This may include essentially determining graphs 400, 500, and 600. The selection of the training technique from backpropagation, backpropagation with activation recomputation, and backpropagation with partial recomputation may then be made. For example, the latencies of the three techniques may be optimized with the constraint that the memory used must not exceed a given capacity. For example, if the memory constraint is that not more than twelve blocks 422, 522, and 622 of one of the graphs 400, 500, and 600 may be used at a particular time, then backpropagation (graph 400) may be employed. In another example, if the memory constraint is that not more than eleven blocks 422, 522, and 622 of one of the graphs 400, 500, and 600 may be used at a particular time, then backpropagation with partial recomputation (graph 600) may be employed. If the memory constraint is that not more than eight blocks 422, 522, and 622 of one of the graphs 400, 500, and 600 may be used at a particular time, then backpropagation with full activation recomputation (graph 500) may be employed. Moreover, the number of activations desired to be stored for partial activation recomputation may be part of the optimization of latency and memory. Thus, a tradeoff between reducing latency and using more memory may be made. As such, training of the learning network 300 may be improved.

Mathematically, the relationship between latency and memory for graphs 400, 500, and 600 can be described as follows. The latency, or time required, for a training iteration for backpropagation (i.e. shown in FIG. 4) may be given by:

$$\tau = \tau_e + \sum_i^N (\tau_{f_i} + \tau_{b_i} + \tau_{wu_i})$$

In the above equation, $\tau$ is the total latency, $\tau_e$ is the latency error, $\tau_{f_i}$ is the latency for the forward path for layer i, $\tau_{b_i}$ is the latency for the backward path for layer i, and $\tau_{wu_i}$ is the latency for determining and carrying out the weight update for layer i, and N is the number of layers. The memory required may be given by:

$$Mem = M_{A_0} + M_T + \sum_i^N M_{A_i} + \max(M_e, M_{\delta_i})$$

In the above equation, Mem is the required memory, $M_{A_0}$ is the memory required to store the input activation, $A_0$, $M_T$ is the memory required to store the target, $M_{A_i}$ is the memory to store the activation for layer i, $M_e$ is the memory for the error, $M_{\delta_i}$ is the memory for storing the backpropagated loss, and N is the number of layers. However, if no activations are stored, then the activations are recomputed using activation recomputation. In such cases (e.g. shown in FIG. 5), the latency may be given by $$\tau = \sum_n^N \sum_i^n \tau_{f_i} + \tau_e + \sum_i^N (\tau_{b_i} + \tau_{wu_i})$$

The variables in the above equation are analogous to those for backpropagation. The additional summation in the first term accounts for the recalculation of activations. In this case, the memory needed is:

$$Mem = M_{A_0} + M_T + \max(M_{A_i}) + \max(M_e, M_{\delta_i})$$

The variables in the above equation are analogous to those for backpropagation. Similarly, the latency for partial activation recomputation may be given by:

$$\tau = \tau_e + \sum_{i}^{N}(\tau_{f_i} + \tau_{b_i} + \tau_{wu_i}) + f(\tau_{f_i})$$

$$0 < f(\tau_{f_i}) < \sum_{n}^{N-1}\sum_{i}^{n}\tau_{f_i}$$

The variables in the above equation are analogous to those for backpropagation. In this case, the memory needed may be given by:

$$Mem = M_{A_0} + \sum_{i}^{N} S_i M_{A_i} + \max(M_e, M_{\delta_i})$$

The variables in the above equation are analogous to those for backpropagation. In addition, the $S_i$ represents a binary vector for the stored activations. Using method 200, particularly process 204 of method 200, the latency may be mathematically optimized for given memory constraints. Thus, training may be made more efficient.

FIG. 7 depicts an embodiment of data flow in learning network 700. Learning network 700 includes layers 710-1, 710-2, 710-3, and 710-4 (collectively or generically 710) and loss calculator 730. Each layer 710 may be considered to include a weight layer and a corresponding activation layer. For example, layer 710-1 may be analogous to weight layer 110-1 in combination with activation layer 120-1. Thus, learning network 700 includes four layers. Another number of layers may be present. Moreover, memory for learning network 700 is typically present, but not explicitly depicted in FIG. 7. However, the associated memory is shown in FIGS. 8-9. FIG. 7 indicates that feedback alignment is used. Thus, in addition to layers 710, transpose layers 720-1, 720-2, 720-3, and 720-4 (collectively or generically 720) are shown. Transpose layers 720 are used for determining weight updates via feedback alignment using the transpose of the weight matrices of corresponding layers 710. Thus, activations ($A_i$, where i=1, 2, 7, or 4) are shown as being output from particular layers 710 in the forward direction (i.e. from the input activation to the output). The backpropagated loss function ($d_i$, where i=1, 2, 7, or 4) is shown as propagating in the backward direction (i.e. from loss calculator 730 to the first layer 720-1).

FIG. 8 is a graph 800 that indicates the latency and memory usage of a training iteration using feedback alignment for the training technique for learning network 700. Graph 800 includes layers 810 and memory 820. Layers 810-1, 810-2, 810-3, and 810-4 (collectively or generically layers 810) correspond to layers 710-1, 710-2, 710-3, and 710-4. Layer 830 corresponds to loss calculator 730. Each cell 812 of layers 810, of which only one is labeled, indicates whether the corresponding layer is used for the time interval. Memory 820 is used in conjunction with learning network 700. Memory 820 includes memory cells 822 that correspond to one or more memory locations in which data are stored. In addition, FIG. 8 indicates that two batches are being used for the training iteration. For layers 810: $F_i^j$ indicates forward propagation (for an inference) through the $i^{th}$ layer for the $j^{th}$ batch; $B_i^j$ indicates propagation backward (for backpropagation/a weight update) through the $i^{th}$ layer for the $j^{th}$ batch; $U_i$ indicates an update of the weights in the $i^{th}$ layer for the $j^{th}$ batch; and $E^j$ indicates a calculation of the loss function for the $j^{th}$ batch. In memory 820, $A_i^j$ indicates storage of the activation for the $i^{th}$ layer and the $j^{th}$ batch; $\delta_i^j$ indicates storage of the backward propagated loss for the $i^{th}$ layer and the $j^{th}$ batch; $T^j$ indicates storage of the target outputs for the $j^{th}$ batch.

FIG. 9 is graph 900 that indicates the latency and memory usage of a training iteration using feedback alignment in combination with activation recomputation for the training technique for learning network 700. Graph 900 includes layers 910 and memory 920. Layers 910-1, 910-2, 910-3, and 910-4 (collectively or generically layers 910) correspond to layers 710-1, 710-2, 710-3, and 710-4. Layer 930 corresponds to loss calculator 730. Each cell 912 of layers 910, of which only one is labeled, indicates whether the corresponding layer is used for the time interval. Memory 920 is used in conjunction with learning network 300. Memory 920 includes memory cells 922 that correspond to one or more memory locations in which data are stored. In addition, FIG. 9 indicates that two batches are being used for the training iteration. For graph 900: $F_i^j$; $B_i^j$; $U_i^j$; $E^j$; $A_i^j$; $\delta_i^j$; and $T^j$ refer to analogous operations and stored quantities as in FIG. 8. For activation recomputation, only the input activations ($A_0$) are stored throughout the training iteration. The remaining activations are computed once in the forward pass and recomputed as necessary for backpropagation.

A comparison of graphs 800 and 900 indicates that feedback alignment with activation recomputation may consume less memory than feedback alignment alone. However, feedback alignment with activation recomputation is more computationally intensive. Graphs 400, 500, 600, 800, and 900 indicate the tradeoffs between latency, computation intensity, and memory usage for various training techniques. In method 200, the training techniques of graphs 400, 500, 600, 800, and 900 may be profiled. This may include essentially determining graphs 400, 500, 600, 800, and 900 at 202. The selection of the training technique from backpropagation, backpropagation with activation recomputation, backpropagation with partial recomputation, feedback alignment, and feedback alignment with activation recomputation, may then be made. For example, the latencies of the five techniques, optionally with other techniques, may be optimized with the constraint that the memory used does not exceed a given capacity. In some embodiments, computation intensity or a measure of power consumed (e.g. peak and/or average power) may also be optimized. Thus, a tradeoff between reducing latency for training, memory consumption during trading, and/or computation intensity of training may be made. As such, training of the learning network 100, 300 and/or 700 may be improved.

Thus, using method 200 training of learning networks may be improved. In some embodiments, the learning networks may be implemented using hardware accelerators. In addition to the layer-wise profiling of models for learning networks, other techniques may be used in combination with method 200. For example, layers 110 may be partitioned into smaller blocks and/or kernel-wise activation recomputation. Similarly, other training techniques, types of learning networks and/or models may be used and optimized using method 200. As previously indicated, descriptors for the model and/or learning network may be used to determine latencies, memory usage, and/or the training techniques desired to be used. For example, FIG. 10 indicates the memory needed for various types of layers. The memory used in connection with the latency for the layer may be used to optimize training of the learning network via method 200.

Learning networks, such as learning networks 100, 300, and 700, may be implemented using a hardware accelerator. For example, FIGS. 11-17 depict compute tiles and compute engines usable in providing learning networks 100, 300, and/or 700. These compute tiles and/or compute engines may be part of a system on a chip and/or network on a chip. Thus, method 200 and graphs 400, 500, 600, 800, and/or 900 may be used in connection with hardware accelerators depicted in FIGS. 11-17.

Figure 11:
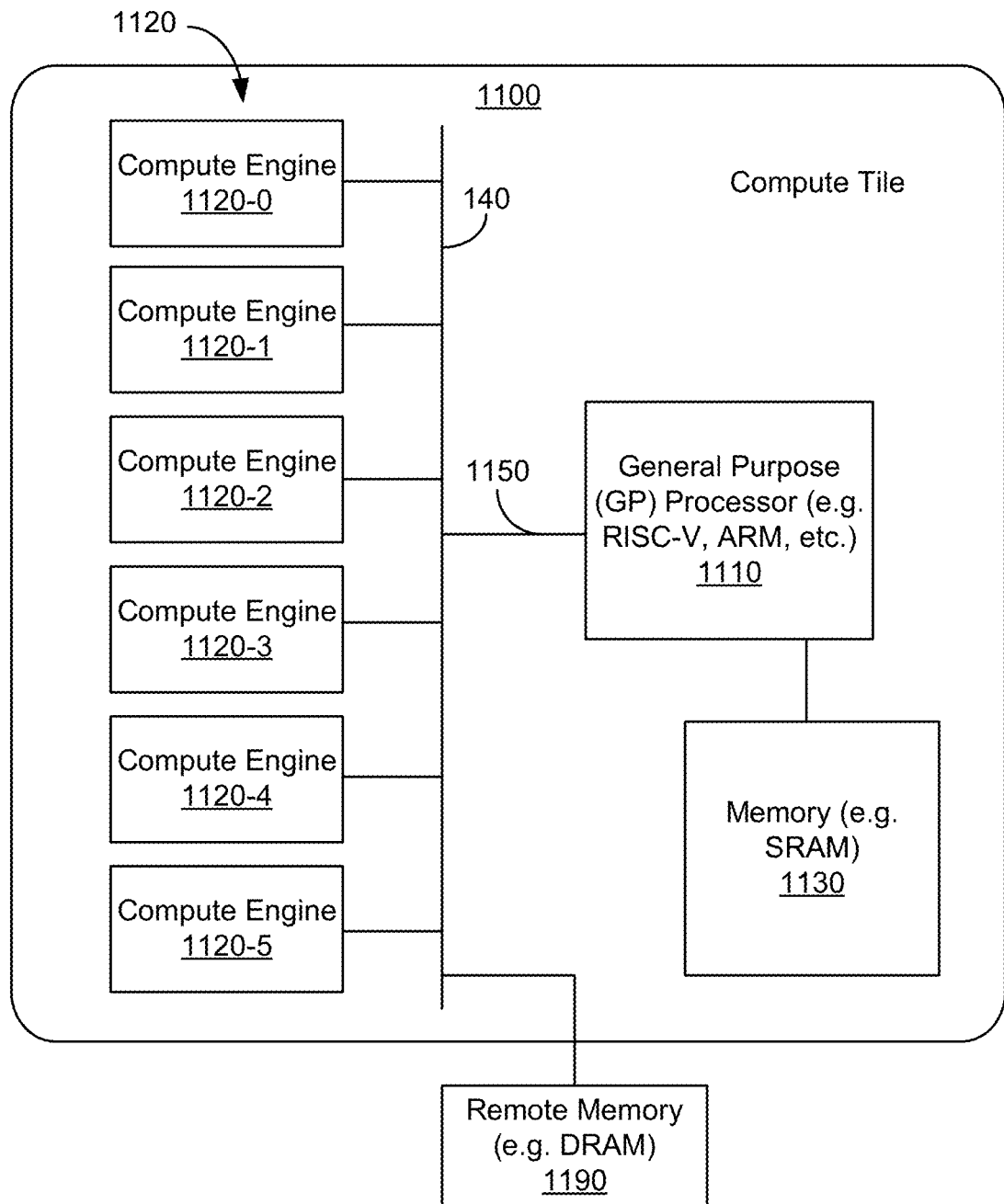
FIG. 11 is a diagram depicting an embodiment of a system usable in an AI accelerator and having an efficient architecture.

FIG. 11 is a diagram depicting an embodiment of system 1100 usable in a learning network. System 1100 is a compute tile and may be considered to be an artificial intelligence (AI) accelerator having an efficient architecture. Compute tile (or simply "tile") 1100 may be implemented as a single integrated circuit. Compute tile 1100 includes a general purpose (GP) processor 1110 and compute engines 1120-0 through 1120-5 (collectively or generically compute engines 1120). Although five compute engines 1120 are shown, in other embodiments another number may be included. GP processor 1110 is shown as being coupled with compute engines 1120 via compute bus (or other connector) 1140, and bus 1150. In other embodiments, GP processor 1110 may be connected with compute engines 1120 in another manner. In some embodiments, compute tile 1100 may include on-tile memory 1130. In other embodiments, memory 1130 may be omitted. Other components, for example a cache or another additional memory, module(s) for applying activation functions, modules for moving data, and/or other modules, may be present in compute tile 1100 in some embodiments.

GP processor 1110 is a reduced instruction set computer (RISC) processor. For example, GP processor 1110 may be a RISC-V processor or ARM processor. In other embodiments, different and/or additional general purpose processor(s) may be used. The GP processor 1110 provides control instructions and data to the compute engines 1120. GP processor 1110 implements instruction set(s) used in controlling compute engines 1120. GP processor 1110 provides the commands to compute engines 1120 and controls data movement to and/or from compute engines 1120. GP processor 1110 may thus function as part of a control plane for (i.e. providing commands and being part of the data path) compute engines 1120 and tile 1100.

In some embodiments, data is moved from memory 1130 or another source to compute engine(s) 1120 through GP processor 1110. Data may be sent from memory 1130 to internal memory of GP processor 1110, and then to the appropriate compute engine(s) 1120 via buses 1140 and 1150. For example, data from memory 1130 may be provided to a vector register file (not shown) of GP processor 1110 and then provided from GP processor 1110 to the appropriate compute engine(s) 1120. Once compute engines 1120 have performed their functions, the output is provided to GP processor 1110. Similarly, data may be moved from compute engines 1120 to memory 1130 or another destination via GP processor 1110. Thus, GP processor 1110 may be part of both the control plane and data plane for compute tile 1100.

GP processor 1110 may also perform other functions. GP processor 1110 may apply activation function(s) to data. For example, an activation function (e.g. a ReLu, Tanh, and/or SoftMax) may be applied to the output of compute engine(s) 1120. Thus, GP processor 1110 may perform nonlinear operations. GP processor 1110 may also perform linear functions and/or other operations. However, GP processor 1110 is still desired to have reduced functionality as compared to, for example, a graphics processing unit (GPU) or central processing unit (CPU) of a computer system with which tile 1100 might be used.

Compute engines 1120 are configured to perform, efficiently and in parallel, tasks that may be part of using (e.g. performing inferences) and/or training (e.g. performing inferences and/or updating weights) a model. Compute engines 1120 are coupled with and receive commands and, in at least some embodiments, data from GP processor 1110. Compute engines 1120 are modules which perform vector-matrix multiplications (VMMs) in parallel. Thus, compute engines 1120 may perform linear operations. Each compute engine 1120 includes a compute-in-memory (CIM) hardware module (not specifically shown in FIG. 11). The CIM hardware module stores weights corresponding to a matrix and is configured to perform a VMM in parallel for the matrix. Compute engines 1120 may also include local update (LU) module(s) (not specifically shown in FIG. 11). Such LU module(s) allow compute engines 1120 to update weights stored in the CIM.

The CIM module is a hardware module that stores data and performs operations. In some embodiments, CIM module stores weights for the model. As such, the CIM module determines the maximum size of the model that can be handled by compute tile 1100 (i.e. the maximum number of parameters, or weights). The CIM module stores the weights (or other data) in cells that are fully addressable. The CIM module also performs operations using the weights. More specifically, the CIM module performs VMMs, where the vector may be an input vector (e.g. an activation) provided using GP processor 1110 and the matrix may be weights (i.e. data/parameters) stored by the CIM module. The CIM module may be considered to include a memory (e.g. that stores the weights) and compute hardware (e.g. that performs the vector-matrix multiplication of the stored weights). In some embodiments, the vector may be a matrix. The CIM module may include an analog SRAM having multiple SRAM cells and configured to provide output(s) (e.g. voltage(s)) corresponding to the data (weight/parameter) stored in each cell of the SRAM multiplied by a corresponding element of the input vector. In some embodiments, the CIM module may include a digital SRAM having multiple SRAM cells and configured to provide output(s) corresponding to the data (weight/parameter) stored in each cell of the digital SRAM multiplied by a corresponding element of the input vector. Other configurations of CIM modules are possible. Each CIM module thus stores weights corresponding to a matrix in its cells and is configured to perform a vector-matrix multiplication of the matrix with an input vector. In some embodiments, the CIM module of a compute engine 1120 may be repurposed as memory if the compute engine utilization falls below a particular threshold (e.g. 170%-80%). For example, the CIM might store duplicate weights or vectors (e.g. activations) in such embodiments.

In order to facilitate on-chip learning, local update (LU) modules (not shown) may also be provided in compute engines 1120. LU modules are coupled with the corresponding CIM modules. LU modules are used to update the weights (or other data) stored in the CIM modules. LU modules are considered local because LU modules are in proximity to CIM modules. For example, LU module(s) for a particular compute engine 1120 may reside in the same integrated circuit as the CIM module(s) for compute engine 1120. In some embodiments, the LU module is considered local because it is fabricated on the same substrate (e.g. the same silicon wafer) as the corresponding CIM module. In some embodiments, LU modules are also used in determining the weight updates. In other embodiments, a separate component may calculate the weight updates. For example, in addition to or in lieu of LU modules, the weight updates may be determined by GP processor 1110, in software by other processor(s) not part of compute tile 1100, by other hardware that is part of compute tile 1100, by other hardware outside of compute tile 1100, and/or some combination thereof.

Memory 1130 may be or include a static random access memory (SRAM) and/or some other type of memory. Memory 1130 is shown as coupled with GP processor 1110. Stated differently, data movement between memory 1130 and compute engines 1120 may take place via GP processor 1120. In some embodiments, memory 1130 may be coupled to compute bus 1140 (i.e. to compute engines 1120). Memory 1130 may store activations (e.g. input vectors provided to compute tile 1100 and the resultant of activation functions applied to the output of compute engines 1120). Memory 1130 may also store weights. For example, memory 1130 may contain a backup copy of the weights or different weights if the weights stored in compute engines 1120 are desired to be changed. In some embodiments, memory 1130 is organized into banks of cells (e.g. banks of SRAM cells). In such embodiments, specific banks of memory 1130 may service specific one(s) of compute engines 1120. In other embodiments, banks of memory 1130 may service any compute engine 1120.

In operation, an input vector is provided to one or more of compute engines 1120 by GP processor 1110. The input vector is desired to be multiplied by the weights, which may have been previously stored in compute engine(s) 1120. An input vector may be provided to multiple compute engines 1120 if the weight matrix and/or input vector have too many elements for a single compute engine. In some such embodiments, a portion of the input vector is provided to each of the multiple compute engines 1120 (each of which stores a portion of the weights). In some embodiments, the input vector is provided from memory 1130 to GP processor 1110 and from GP processor 1110 to compute engine(s) 1120. GP processor 1110 also instructs compute engine(s) 1120 to perform a VMM. Compute engine(s) 1120 perform a VMM between the input vector and the matrix of weights to provide an output. The VMM is performed in parallel for the elements of the input vector. The output of compute engine (s) 1120 may be considered an output vector. The output is provided by compute engine(s) 1120 to GP processor 1110. For example, the output may be stored in a vector register file of GP processor 1110. GP processor 1110 may also store the output (e.g. in memory 1130) and/or may provide the output to another component off-tile. GP processor 1110 may apply a function (e.g. an activation function) to the output. The results of the activation function applied to the output of compute engines 1120 may be stored in GP processor 1110 (e.g. in a buffer or the vector register file). GP processor 1110 may also store the results in memory 1130 or off-tile. GP processor 1110 may provide the results as an input vector to other compute engine(s) 1120 to apply a different set of weights to the results where another set of weights are stored in other compute engine(s) 1120. Thus, one or more inferences with one or more distinct sets of weights may be performed. In some embodiments, training may also be performed by tile 1100. In some such embodiments, GP processor 1110 or another component (such as a host) may determine the desired update for the weights. In some embodiments, LU module (not shown) of compute engines 1120 may be used to determine and apply the updates to the weights.

Also shown in FIG. 11 is remote memory 1190. For example, remote memory 1190 may include or be DRAM memory. Remote memory 1190 may be used for long term storage. For example, input activations for training, target outputs for training, and/or other information may be stored in DRAM 1190. This information may be loaded into compute tile 1100 as desired. For example, if compute tile 1190 includes insufficient memory for performing a training iteration as part of method 200, activations and/or other data may be temporarily stored and loaded from DRAM 1190 during the training iteration of method 200.

Thus, compute tile 1100 includes two compute blocks, GP processor 1110 and compute engines 1120, which work together. GP processor 1110 may perform nonlinear operations (e.g. activation functions) and compute engines perform 1120 may perform linear operations (e.g. VMMs). GP processor 1110 is in the control and data planes for compute engines 1120. GP processor 1110 and compute engines 1120 are, therefore, tightly coupled. Consequently, data may be moved more efficiently within tile 1100. Operations, such as VMMs and the application of activation functions to the output of compute engines 1120, may be more efficiently performed. Further, a special purpose controller need not be designed and fabricated for compute tile 1100. Instead, GP processor 1110 is used. As a result, compute tile 1100 may be more flexible and more readily designed and fabricated. For example, the activation applied by GP processor 1110 may be updated by updating GP processor 1110. A new special purpose controller need not be provided. Consequently, functions for machine learning may be more efficiently and readily performed. In addition, compute tile 1100 includes on-tile memory 1130. Use of on-tile memory, for example as a scratchpad memory, allows for a high degree of independence of compute tile 1100 from other components (e.g. other tiles). Thus, multiple tiles 1100 may more readily work in parallel. Consequently, efficiency of learning may be enhanced.

Figure 12:
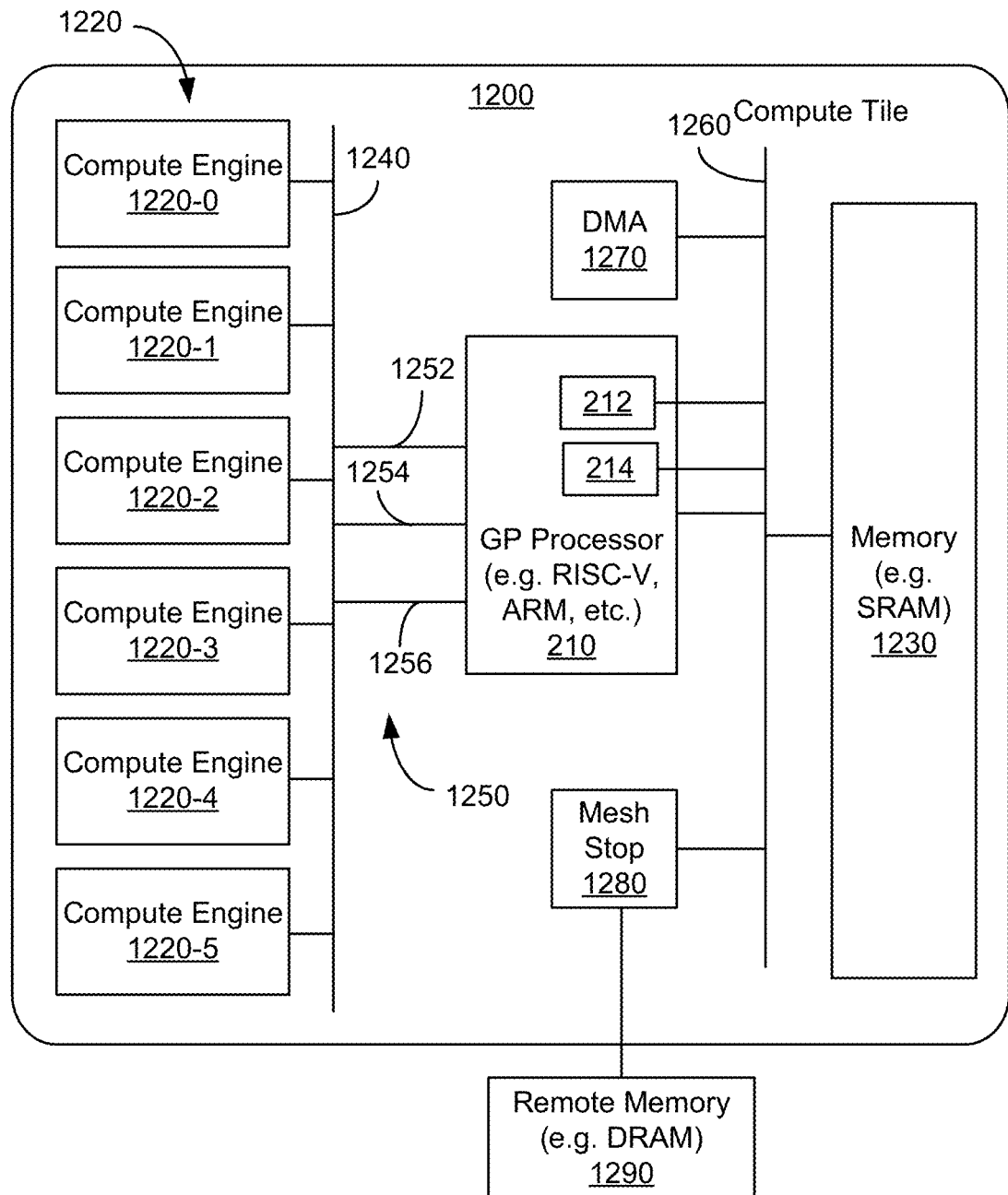
FIG. 12 depicts an embodiment of a system usable in an AI accelerator and having an efficient architecture.

FIG. 12 is a diagram depicting an embodiment of compute tile 1200 usable in a learning network. Compute tile 1200 that may be an AI accelerator having an efficient architecture. Compute tile 1200 is analogous to compute tile 1100. Compute tile 1200 thus includes GP processor 1210 and compute engines 1220-0 through 1220-5 (collectively or generically compute engines 1220) analogous to GP processor 1110 and compute engines 1110-0 through 1110-5, respectively. Although five compute engines 1210 are shown, in other embodiments another number may be included. GP processor 1210 is shown as being coupled with compute engines 1220 via compute bus (or other connector) 1240, and bus 1250. In other embodiments, GP processor 1210 may be connected with compute engines 1220 in another manner. Compute tile 1200 may include on-tile memory 1230 that is analogous to on-tile memory 1130. Memory 1230 may thus be or include SRAM. Data movement between memory 1230 and compute engines 1220 may take place via GP processor 1220. In some embodiments, memory 1230 may be coupled to compute bus 1240 (i.e. to compute engines 1220). In the embodiment shown, compute tile 1200 also includes bus 1260, direct memory access (DMA) module 1270, and mesh stop 1280.

GP processor 1210 is analogous to GP processor 1110. Thus, GP processor 1210 may be a RISC-V processor or ARM processor. In other embodiments, different and/or additional general purpose processor(s) may be used. The GP processor 1210 provides control instructions and manages data flow for the compute engines 1220. Data sent to or from compute engines 1220 may also pass through GP processor 1210. Thus, GP processor 1210 may be part of both the control plane and data plane for compute tile 1200. GP processor 1210 may also perform other functions, including nonlinear functions. For example, GP processor 1210 may apply activation function(s) to data. In some embodiments, GP processor 1210 may include a vector processing unit (not shown) that executes nonlinear operations (e.g. applying activation functions to data). Also explicitly shown as part of GP processor 1210 are local memories 1212 and 1214. In some embodiments, local memory 1212 stores instructions while local memory 1214 stores data.

Compute engines 1220 are analogous to compute engines 1120. Compute engines 1220 are configured to perform, efficiently and in parallel, tasks that may be part of using and/or training a model. Compute engines 1220 are coupled with and receive commands and, in at least some embodiments, data from GP processor 1210. Compute engines 1220 perform linear operations such as VMMs in parallel. Each compute engine 1220 includes a CIM hardware module (not specifically shown in FIG. 12) analogous to that described for compute engines 1120. The CIM hardware module stores weights corresponding to a matrix and is configured to perform a VMM for the matrix. Compute engines 1220 may also include LU module(s) (not specifically shown in FIG. 12).

Bus 1250 couples GP processor 1210 with compute bus 1240 and, therefore, with compute engines 1220. Compute bus 1250 includes control bus 1252, streaming bus 1254, and status bus 1256. Control bus 1252, streaming bus 1254, and status bus 1256 are coupled with a control port (not explicitly labeled), a streaming port (not explicitly labeled), and a status port (not explicitly labeled), respectively, of GP processor 1210. Control bus 1252 receives instructions for compute engines 1220 from GP processor 1210. Compute engines 1220 perform operations based on the instructions. For example, the instructions may include a load instruction to load data from GP processor 1210 to identified compute engine(s) 1220, a store instruction to store data from identified compute engine(s) 1220 to GP processor 1210, and supporting instructions that identify the addresses in identified compute engine(s) 1220 to which data is to be loaded and from which data is to be read. Streaming bus 1254 may be a high speed, high bandwidth bus. In some embodiments, streaming bus 1254 is 512 bits wide. Other bus widths are possible. Streaming bus 1254 is used to rapidly move data between GP processor 1210 and compute engines 1220. Status bus may allow for reading from or writing to a status register for a compute engine 1220. Thus, GP processor 1210 may be informed of the particular compute engine 1220 completing a task, such as a VMM.

Compute tile 1200 also includes DMA 1270 and mesh stop 1280. DMA 1270 initiates data movement for compute tile 1200. DMA 1270 may be used to move data from off-tile to on-tile and vice-versa. Thus, DMA 1270 may be used to communicate with a host (not shown) and/or other tiles (not shown in FIG. 12). For example, DMA 1270 may be used to move input vectors (activations) from the host or another tile (not shown in FIG. 12) to memory 1230. If memory 1230 is also directly connected to compute engines 1220 (e.g. via compute bus 1240), then DMA 1270 may be used to move data between memory 1230 and compute engines 1220. Mesh stop 1280 provides an interface between compute tile 1200 and the fabric of a mesh network that includes compute tile 1200. Thus, mesh stop 1280 may be used to communicate with other compute tiles (not shown) with which compute tile 1200 may be used. Mesh stop 1280 may also be used to communicate with remote DRAM 1290. Data may also be moved via bus 1260. In some embodiments, therefore, data may be moved to and/or from memory 1230 as well as to and/or from tile 1200 via buses such as bus 1240, 1250, and/or 1260.

Compute tile 1200 functions in an analogous manner to compute tile 1100. For example, data may be transferred on-tile from a host or other tile via DMA 1270 and/or mesh stop 1280. Such data may be stored in memory 1230. Thus, memory 1230 may store weights and input vectors. The weights may be loaded in one or more compute engines 1220 for use. For example, the weights may be moved from memory 1230 to the CIM hardware module(s) of compute engine(s) 1220 via GP processor 1210. For an inference, an input vector is provided to one or more of compute engines 1220 by GP processor 1210. To do so, the input vector/activation may be moved from memory 1230 to GP processor 1210 and from GP processor 1210 to compute engine(s) 1220 via streaming bus 1254. Compute engine(s) 1220 perform a VMM in parallel of the elements of the input vector and the matrix (or matrices) of weights stored in compute engine(s) 1220. The output of compute engine(s) 1220 may be stored from compute engine(s) 1220 to GP processor 1210 via streaming bus 1254. GP processor 1210 may apply a function (e.g. an activation function) to the output. The resultant of the activation function applied to the output of compute engines 1220 may be stored in GP processor 1210 (e.g. a buffer, which is not explicitly shown in FIG. 12). GP processor 1210 may also store the resultant in memory 1230. GP processor 1210 may provide the resultant to another tile or the host via mesh stop 1280 or DMA 1270. GP processor may provide the resultant as an input vector to other compute engine(s) 1220 to apply a different set of weights to the resultant where another set of weights are stored in other compute engine(s). Thus, one or more inferences with one or more distinct sets of weights may be performed. In some embodiments, training may also be performed by tile 1200. In some such embodiments, GP processor 1210 or another component (such as a host) may determine the desired update for the weights. In some embodiments, LU module (not shown) of compute engines 1220 may be used to determine and apply the updates to the weights.

Compute tile 1200 may share the benefits of compute tile 1100. GP processor 1210 and compute engines 1220 are compute blocks which work closely together. For example, the data and control planes for compute tile 1200 may include memory 1230, GP processor 1210, buses 1240 and 1250, and compute engines 1220. Consequently, data may be moved more efficiently within tile 1200 and operations, such as VMMs and the application of activation functions, may be more efficiently performed. Further, a special purpose controller need not be designed and fabricated for compute tile 1200. As a result, compute tile 1200 may be more flexible and more readily designed and fabricated. Consequently, functions for machine learning may be more efficiently and readily performed. In addition, on-tile memory 1230 allows for a high degree of independence of compute tile 1200 from other components (e.g. other tiles). Thus, multiple tiles 1200 may more readily work in parallel and efficiency may be improved.

Figure 13:
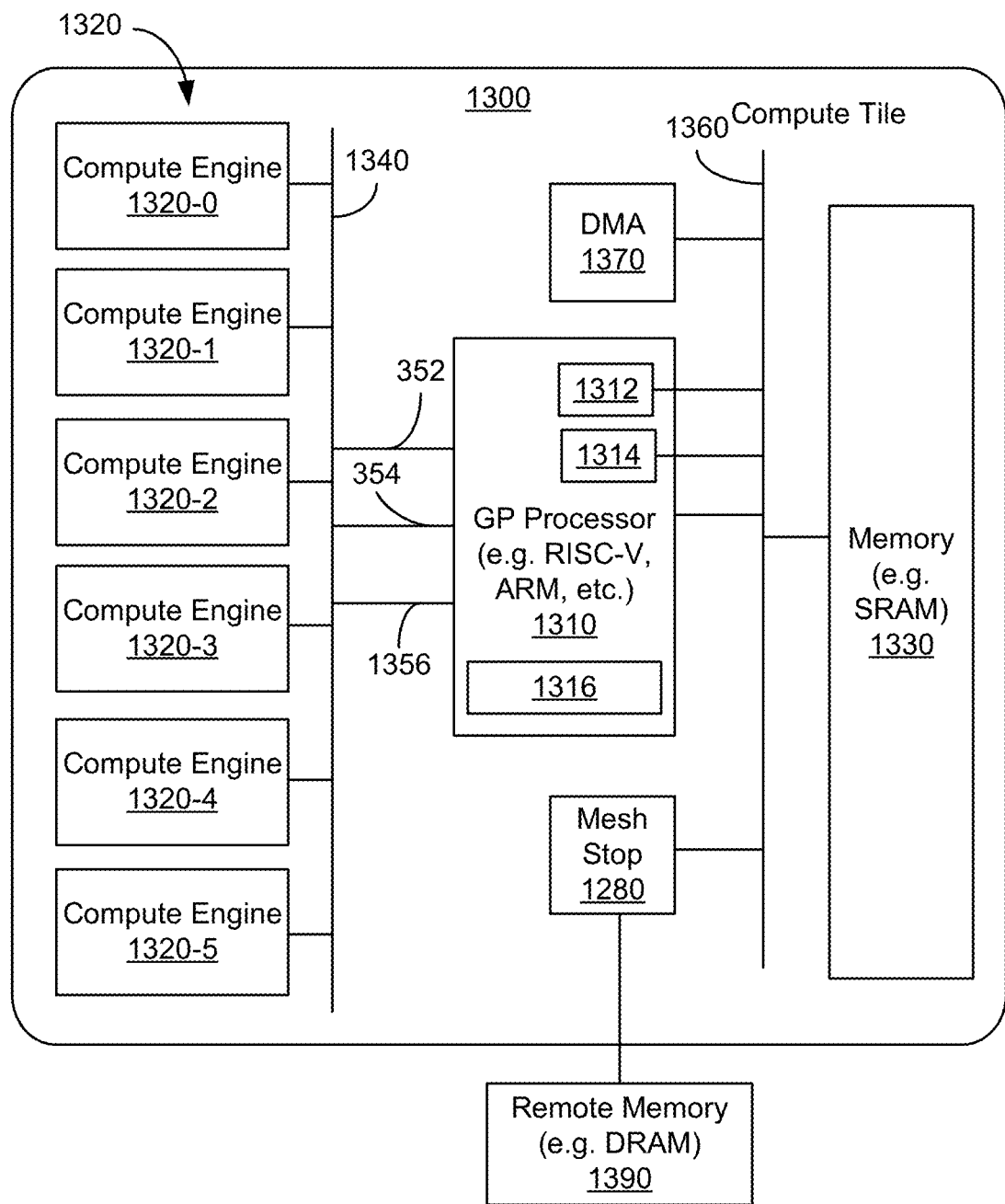
FIG. 13 depicts an embodiment of a system usable in an AI accelerator and having an efficient architecture.

FIG. 13 is a diagram depicting an embodiment of compute tile 1300 usable in a learning network. Compute tile 1300 that may be an AI accelerator having an efficient architecture. Compute tile 1300 is analogous to compute tiles 1100 and 1200. Compute tile 1300 thus includes GP processor 1310, compute engines 1320-0 through 1320-5 (collectively or generically compute engines 1320), memory 1330, compute bus 1340, bus 1350, bus 1360, DMA 1370, and mesh stop 1380 that are analogous to GP processors 1110/210, compute engines 1120/220, memory 1130/230, compute bus 1140/240, bus 1150/250, bus 1260, DMA 1270, and mesh stop 1280, respectively. Although five compute engines 1310 are shown, in other embodiments another number may be included. GP processor 1310 is shown as being coupled with compute engines 1320 via compute bus (or other connector) 1340, and bus 1350. In other embodiments, GP processor 1310 may be connected with compute engines 1320 in another manner. GP processor 1310 also includes memories 1312 and 1314 analogous to local memories 1212 and 1214, respectively. Data movement between memory 1330 and compute engines 1320 may take place via GP processor 1320. For example, bus 1350 includes control bus 1352, streaming bus 1354, and status bus 1356 analogous to control bus 1252, streaming bus 1254, and status bus 1256, respectively. In some embodiments, memory 1330 may be coupled to compute bus 1340 (i.e. to compute engines 1320). Also shown is remote memory 1390 analogous to remote memories 1190 and/or 1290.

GP processor 1310 is analogous to GP processors 1110 and/or 1210. Thus, GP processor 1310 may be a RISC-V processor or ARM processor. In other embodiments, different and/or additional general purpose processor(s) may be used. The GP processor 1310 provides control instructions and manages dataflow for the compute engines 1320. Data sent to or from compute engines 1320 may also pass through GP processor 1310. Thus, GP processor 1310 may be part of both the control plane and data plane for compute tile 1300. GP processor 1310 may also perform other functions, including nonlinear functions. For example, GP processor 1310 may apply activation function(s) to data. In some embodiments, GP processor 1310 may include a vector processing unit (not shown) that executes nonlinear operations (e.g. applying activation functions to data).

In addition, GP processor includes an additional fixed function compute block (FFCB) 1316. In some embodiments, FFCB 1316 is a single instruction multiple data arithmetic logic unit (SIMD ALU). In some embodiments, FFCB 1316 may be configured in another manner. FFCB 1316 may be a close-coupled fixed-function unit for on-device inference and training of learning networks. In some embodiments, FFCB 1316 executes nonlinear operations, number format conversion and/or dynamic scaling. In some embodiments, other and/or additional operations may be performed by FFCB 1316. FFCB 1316 may be coupled with the data path for the vector processing unit of GP processor 1310.

Compute engines 1320 are analogous to compute engines 1120 and/or 1220. Compute engines 1320 are configured to perform, efficiently and in parallel, tasks that may be part of using and/or training a model. Compute engines 1320 are coupled with and receive commands and, in at least some embodiments, data from GP processor 1310. Compute engines 1320 perform linear operations such as VMMs in parallel. Each compute engine 1320 includes a CIM hardware module (not specifically shown in FIG. 13) analogous to that described for compute engines 1120. The CIM hardware module stores weights corresponding to a matrix and is configured to perform a VMM for the matrix. Compute engines 1320 may also include LU module(s) (not specifically shown in FIG. 13). In addition, on-tile memory 1330 allows for a high degree of independence of compute tile 1300 from other components (e.g. other tiles). Thus, multiple tiles 1300 may more readily work in parallel.

Figure 14:
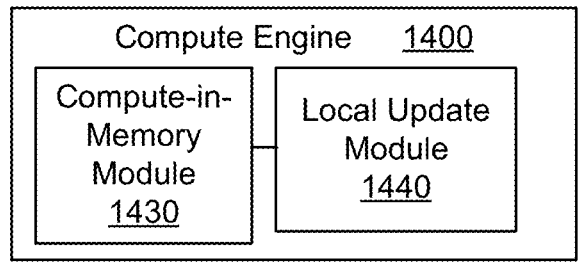
FIG. 14 depicts an embodiment of a portion of a compute engine usable in an AI accelerator.

FIG. 14 depicts compute engine 1400 usable in an AI accelerator. Compute engine 1400 may be part of an AI accelerator that can be deployed for using a model (not explicitly depicted) and for allowing for on-chip training of the model (otherwise known as on-chip learning). Compute engine 1400 may thus be used as compute engine(s) 1120, 1220, and/or 1320. Compute engine 1400 includes CIM module 1430 and LU module 1440. Although one CIM module 1430 and one LU module 1440 is shown, a compute engine may include another number of CIM modules 1430 and/or another number of LU modules 1440. For example, a compute engine might include three CIM modules 1430 and one LU module 1440, one CIM module 1430 and two LU modules 1440, or two CIM modules 1430 and two LU modules 1440.

CIM module 1430 is a hardware module that stores data and performs operations. In some embodiments, CIM module 1430 stores weights for the model. CIM module 1430 also performs operations using the weights. More specifically, CIM module 1430 performs vector-matrix multiplications, where the vector may be an input vector provided using processor 1110 and the matrix may be weights (i.e. data/parameters) stored by CIM module 1430. Thus, CIM module 1430 may be considered to include a memory (e.g. that stores the weights) and compute hardware (e.g. that performs the vector-matrix multiplication of the stored weights). In some embodiments, the vector may be a matrix (i.e. an n×m vector where n>1 and m>1). For example, CIM module 1430 may include an analog static random access memory (SRAM) having multiple SRAM cells and configured to provide output(s) (e.g. voltage(s)) corresponding to the data (weight/parameter) stored in each cell of the SRAM multiplied by a corresponding element of the input vector. In some embodiments CIM module 1430 may include a digital static SRAM having multiple SRAM cells and configured to provide output(s) corresponding to the data (weight/parameter) stored in each cell of the digital SRAM multiplied by a corresponding element of the input vector. In some embodiments, CIM module 1430 may include an analog resistive random access memory (RAM) configured to provide output (e.g. voltage(s)) corresponding to the impedance of each cell multiplied by the corresponding element of the input vector. Other configurations of CIM module 1530 are possible. Each CIM module 1430 thus stores weights corresponding to a matrix in its cells and is configured to perform a vector-matrix multiplication of the matrix with an input vector.

In order to facilitate on-chip learning, LU module 1440 may be provided. LU module 1440 is coupled with the corresponding CIM module 1430. LU module 1440 is used to update the weights (or other data) stored in CIM module 1430. LU module 1440 is considered local because LU module 1440 is in proximity with CIM module 1430. For example, LU module 1440 may reside on the same integrated circuit as CIM module 1430. In some embodiments LU module 1440 for a particular compute engine resides in the same integrated circuit as the CIM module 1430. In some embodiments, LU module 1440 is considered local because it is fabricated on the same substrate (e.g. the same silicon wafer) as the corresponding CIM module 1430. In some embodiments, LU module 1440 is also used in determining the weight updates. In other embodiments, a separate component may calculate the weight updates. For example, in addition to or in lieu of LU module 1440, the weight updates may be determined by a GP processor, in software by other processor(s) not part of compute engine 1400 and/or the corresponding AI accelerator (e.g. compute tile 1100, 1200, or 1300), by other hardware that is part of compute engine 1400 and/or the corresponding AI accelerator (e.g. compute tile 1100, 1200, or 1300), by other hardware outside of compute engine 1400 or the corresponding AI accelerator (e.g. compute tile 1100, 1200, or 1300), and/or some combination thereof.

Using compute engine 1400 in the context of compute tiles 1100, 1200, or 1300 and/or an analogous system, efficiency and performance of a learning network may be improved. Use of CIM modules 1430 may dramatically reduce the time to perform the vector-matrix multiplication that provides the weighted signal. Thus, performing inference(s) using compute engine 1400 may require less time and power. This may improve efficiency of training and use of the model. LU modules 1440 allow for local updates to the weights in CIM modules 1430. This may reduce the data movement that may otherwise be required for weight updates. Consequently, the time taken for training may be greatly reduced. In some embodiments, the time taken for a weight update using LU modules 1440 may be an order of magnitude less (i.e. require one-tenth the time) than if updates are not performed locally. Efficiency and performance of a learning network provided using system 1100 may be increased.

Figure 15:
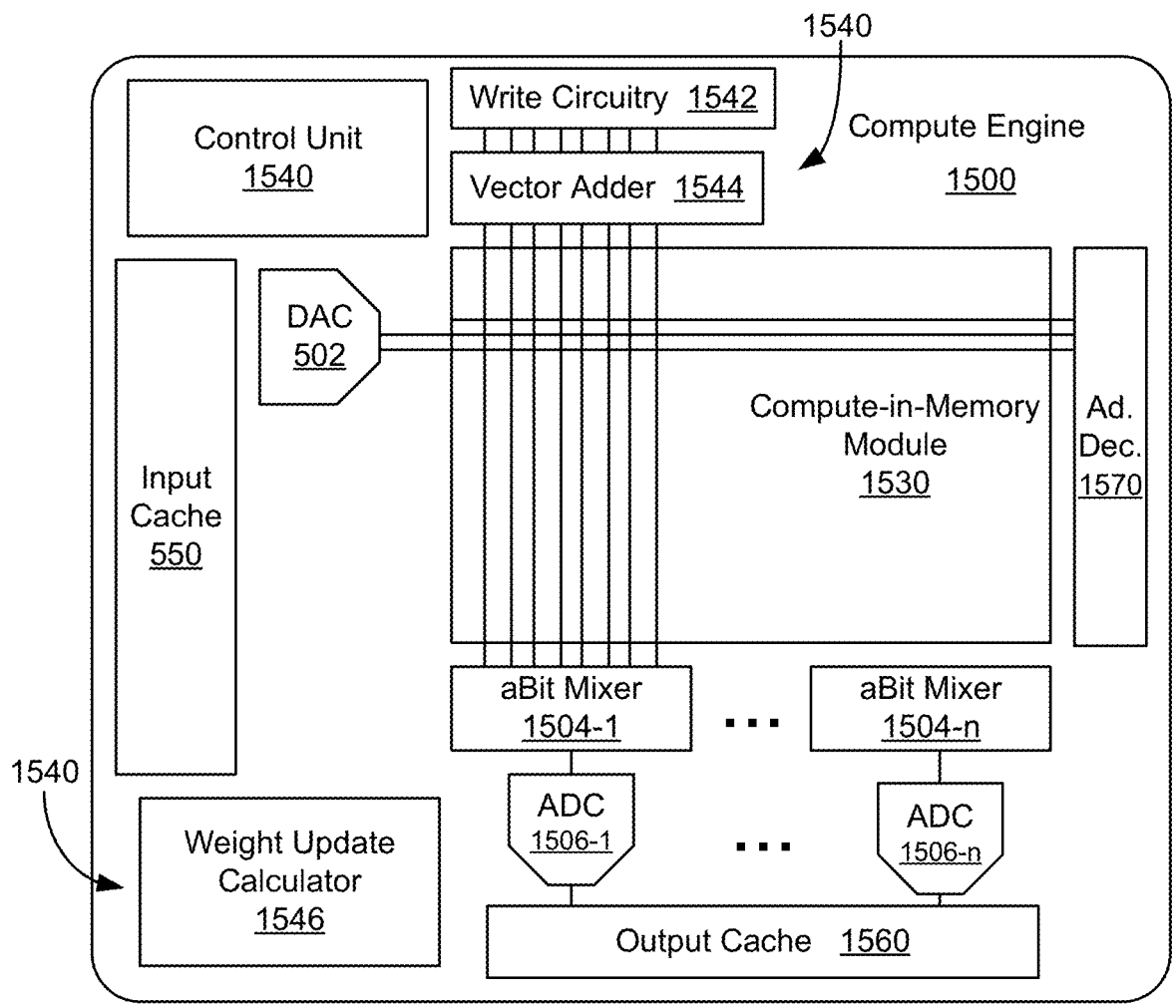
FIG. 15 depicts an embodiment of a portion of a compute engine usable in an AI accelerator and capable of performing local updates.

FIG. 15 depicts an embodiment of compute engine 1500 usable in an AI accelerator and capable of performing local updates. Compute engine 1500 may be a hardware compute engine analogous to compute engine 1400. Compute engine 1500 thus includes CIM module 1530 and LU module 1540 analogous to CIM modules 1430 and LU modules 1440, respectively. Compute engine 1500 also includes analog bit mixer (aBit mixer) 1504-1 through 1504-$n$ (generically or collectively 1504), analog to digital converter(s) (ADC(s)) 1506-1 through 1506-$n$ (generically or collectively 1506), input cache 1550, output cache 1560, and address decoder 1570. Although particular numbers of components 1502, 1504, 1506, 1530, 1540, 1542, 1544, 1546, 1360, and 1570 are shown, another number of one or more components 1502, 1504, 1506, 1530, 1540, 1542, 1544, 1546, 1360, and 1570 may be present.

CIM module 1530 is a hardware module that stores data corresponding to weights and performs vector-matrix multiplications. The vector is an input vector provided to CIM module 1530 (e.g. via input cache 1550) and the matrix includes the weights stored by CIM module 1530. In some embodiments, the vector may be a matrix. Examples of embodiments CIM modules that may be used in CIM module 1530 are depicted in FIGS. 16 and 17.

Figure 16:
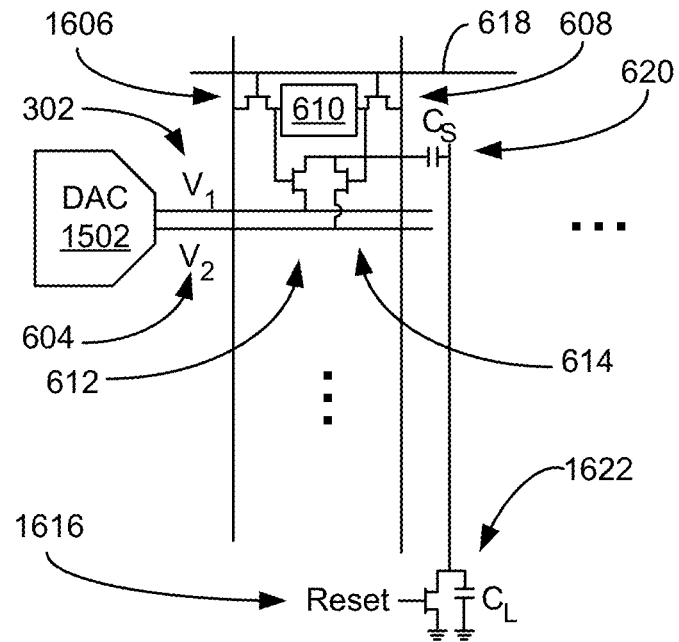
FIG. 16 depicts an embodiment of a portion of a compute-in-memory module usable in an AI accelerator.

FIG. 16 depicts an embodiment of a cell in one embodiment of an SRAM CIM module usable for CIM module 1530. Also shown is DAC 1502 of compute engine 1500. For clarity, only one SRAM cell 1610 is shown. However, multiple SRAM cells 1610 may be present. For example, multiple SRAM cells 1610 may be arranged in a rectangular array. An SRAM cell 1610 may store a weight or a part of the weight. The CIM module shown includes lines 1602, 1604, and 1618, transistors 1606, 1608, 1612, 1614, and 1616, capacitors 1620 ($C_S$) and 1622 (CL). In the embodiment shown in FIG. 16, DAC 1502 converts a digital input voltage to differential voltages, $V_1$ and $V_2$, with zero reference. These voltages are coupled to each cell within the row. DAC 1502 is thus used to temporal code differentially. Lines 1602 and 1604 carry voltages $V_1$ and $V_2$, respectively, from DAC 1502. Line 1618 is coupled with address decoder 1570 (not shown in FIG. 16) and used to select cell 1610 (and, in the embodiment shown, the entire row including cell 1610), via transistors 1606 and 1608.

In operation, voltages of capacitors 1620 and 1622 are set to zero, for example via Reset provided to transistor 1616. DAC 1502 provides the differential voltages on lines 1602 and 1604, and the address decoder (not shown in FIG. 16) selects the row of cell 1610 via line 1618. Transistor 1612 passes input voltage $V_1$ if SRAM cell 1610 stores a logical 1, while transistor 1614 passes input voltage $V_2$ if SRAM cell 1610 stores a zero. Consequently, capacitor 1620 is provided with the appropriate voltage based on the contents of SRAM cell 1610. Capacitor 1620 is in series with capacitor 1622. Thus, capacitors 1620 and 1622 act as capacitive voltage divider. Each row in the column of SRAM cell 1610 contributes to the total voltage corresponding to the voltage passed, the capacitance, $C_S$, of capacitor 1620, and the capacitance, CL, of capacitor 1622. Each row contributes a corresponding voltage to the capacitor 1622. The output voltage is measured across capacitor 1622. In some embodiments, this voltage is passed to the corresponding aBit mixer 1504 for the column. In some embodiments, capacitors 1620 and 1622 may be replaced by transistors to act as resistors, creating a resistive voltage divider instead of the capacitive voltage divider. Thus, using the configuration depicted in FIG. 16, CIM module 1530 may perform a vector-matrix multiplication using data stored in SRAM cells 1610.

Figure 17:
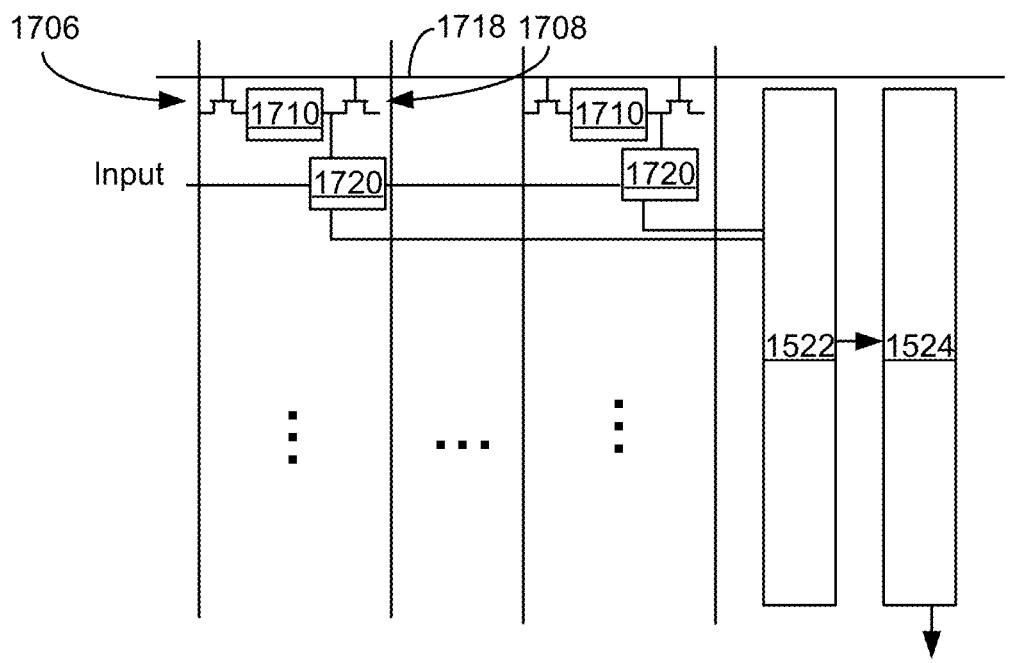
FIG. 17 depicts an embodiment of a portion of a compute-in-memory module usable in an AI accelerator.

FIG. 17 depicts an embodiment of a cell in one embodiment of a digital SRAM module usable for CIM module 1530. For clarity, only one digital SRAM cell 1710 is labeled. However, multiple cells 1710 are present and may be arranged in a rectangular array. Also labeled are corresponding transistors 1706 and 1708 for each cell, line 1718, logic gates 1720, adder tree 1722 and digital mixer 1724. Because the SRAM module shown in FIG. 17 is digital, DACs 1502, aBit mixers 1504, and ADCs 1506 may be omitted from compute engine 1500 depicted in FIG. 15.

In operation, a row including digital SRAM cell 1710 is enabled by address decoder 1570 (not shown in FIG. 17) using line 1718. Transistors 1706 and 1708 are enabled, allowing the data stored in digital SRAM cell 1710 to be provided to logic gates 1720. Logic gates 1720 combine the data stored in digital SRAM cell 1710 with the input vector. Thus, the binary weights stored in digital SRAM cells 1710 are combined with the binary inputs. The output of logic gates 1720 are accumulated in adder tree 1722 and combined by digital mixer 1724. Thus, using the configuration depicted in FIG. 17, CIM module 1530 may perform a vector-matrix multiplication using data stored in digital SRAM cells 1710.

Referring back to FIG. 15, CIM module 1530 thus stores weights corresponding to a matrix in its cells and is configured to perform a vector-matrix multiplication of the matrix with an input vector. In some embodiments, compute engine 1500 stores positive weights in CIM module 1530. However, the use of both positive and negative weights may be desired for some models and/or some applications. In such cases, bipolar weights (e.g. having range-S through +S) are mapped to a positive range (e.g. 0 through S). For example, a matrix of bipolar weights, W, may be mapped to a positive weight matrix $W_p$ such that: $Wx=(W_p-SJ/2)(2x)=15W_p x - S\Sigma_i x_i$, where J is a matrix of all ones having the same size as W and S is the maximum value of the weight (e.g. $12^{N-1}-1$ for an N-bit weight). For simplicity, compute engine 1500 is generally discussed in the context of CIM module 1530 being an analog SRAM CIM module analogous to that depicted in FIG. 16.

Input cache 1550 receives an input vector for which a vector-matrix multiplication is desired to be performed. In some embodiments, the input vector is provided to input cache by a GP processor, such as GP processor 1110. The input vector may be read from a memory, from a cache or register in the processor, or obtained in another manner. Digital-to-analog converter (DAC) 1502 converts a digital input vector to analog in order for CIM module 1530 to operate on the vector. Although shown as connected to only some portions of CIM module 1530, DAC 1502 may be connected to all of the cells of CIM module 1530. Alternatively, multiple DACs 1502 may be used to connect to all cells of CIM module 1530. Address decoder 1570 includes address circuitry configured to selectively couple vector adder 1544 and write circuitry 1542 with each cell of CIM module 1530. Address decoder 1570 selects the cells in CIM module 1530. For example, address decoder 1570 may select individual cells, rows, or columns to be updated, undergo a vector-matrix multiplication, or output the results. In some embodiments, aBit mixer 1504 combines the results from CIM module 1530. Use of aBit mixer 1504 may save on ADCs 1506 and allows access to analog output voltages.

ADC(s) 1506 convert the analog resultant of the vector-matrix multiplication to digital form. Output cache 1560 receives the result of the vector-matrix multiplication and outputs the result from compute engine 1500. Thus, a vector-matrix multiplication may be performed using CIM module 1530.

LU module 1540 includes write circuitry 1542 and vector adder 1544. In some embodiments, LU module 1540 includes weight update calculator 1546. In other embodiments, weight update calculator 1546 may be a separate component and/or may not reside within compute engine 1500. Weigh update calculator 1546 is used to determine how to update to the weights stored in CIM module 1530. In some embodiments, the updates are determined sequentially based upon target outputs for the learning system of which compute engine 1500 is a part. In some embodiments, the weight update provided may be sign-based (e.g. increments for a positive sign in the gradient of the loss function and decrements for a negative sign in the gradient of the loss function). In some embodiments, the weight update may be ternary (e.g. increments for a positive sign in the gradient of the loss function, decrements for a negative sign in the gradient of the loss function, and leaves the weight unchanged for a zero gradient of the loss function). Other types of weight updates may be possible. In some embodiments, weight update calculator 1546 provides an update signal indicating how each weight is to be updated. The weight stored in a cell of CIM module 1530 is sensed and is increased, decreased, or left unchanged based on the update signal. In particular, the weight update may be provided to vector adder 1544, which also reads the weight of a cell in CIM module 1530. More specifically, adder 1544 is configured to be selectively coupled with each cell of CIM module by address decoder 1570. Vector adder 1544 receives a weight update and adds the weight update with a weight for each cell. Thus, the sum of the weight update and the weight is determined. The resulting sum (i.e. the updated weight) is provided to write circuitry 1542. Write circuitry 1542 is coupled with vector adder 1544 and the cells of CIM module 1530. Write circuitry 1542 writes the sum of the weight and the weight update to each cell. In some embodiments, LU module 1540 further includes a local batched weight update calculator (not shown in FIG. 15) coupled with vector adder 1544. Such a batched weight update calculator is configured to determine the weight update.

Compute engine 1500 may also include control unit 1540. Control unit 1540 generates the control signals depending on the operation mode of compute engine 1500. Control unit 1540 is configured to provide control signals to CIM hardware module 1530 and LU module 1549. Some of the control signals correspond to an inference mode. Some of the control signals correspond to a training, or weight update mode. In some embodiments, the mode is controlled by a control processor (not shown in FIG. 15, but analogous to processor 1110) that generates control signals based on the Instruction Set Architecture (ISA).

In inference mode, the input data is multiplied by the stored weights and output is obtained after ADC 1506. This mode may include many steps. For example, if capacitors arranged in a voltage divider are used to provide the output (e.g. in FIG. 16), the capacitors (or other storage elements) may be reset. For example, capacitors are rest to either zero or certain precharge value depending on the functionality of the capacitor. Capacitive voltage divider operation is enabled to provide the output of the vector-matrix-multiplication. aBit mixer 1504 is enabled. ADC(s) 1506 are also enabled. Data are stored in output cache 1560 to be passed to the compute engine or other desired location(s). This process may be repeated for the entire vector multiplication. In weight update mode, the weight update signals may be generated sequentially by weight update calculator 1546. In parallel, cells in a row of CIM module 1530 are read row by row and passed to adder 1544 for the corresponding weight update.

Using compute engine 1500, efficiency and performance of a learning network may be improved. CIM module 1530 may dramatically reduce the time to perform the vector-matrix multiplication. Thus, performing inference(s) using compute engine 1500 may require less time and power. This may improve efficiency of training and use of the model. LU module 1540 uses components 1542, 1544, and 1546 to perform local updates to the weights stored in the cells of CIM module 1530. This may reduce the data movement that may otherwise be required for weight updates. Consequently, the time taken for training may be dramatically reduced. Efficiency and performance of a learning network provided using compute engine 1500 may be increased.

Thus, method 200 may be used in connection with learning networks provided using computer tile(s) 1100, 1200, and/or 1300 as well as compute engines 1400 and/or 1500. Thus, in addition to improved training, the learning networks may have improved performance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   profiling a model for a learning network having a plurality of layers and associated memory, the plurality of layers including a plurality of weight layers and a plurality of activation layers, the plurality of weight layers including a plurality of weights, the plurality of weight layers corresponding to at least one compute engine, each of the at least one compute engine including a compute-in-memory (CIM) hardware module, the CIM hardware module being configured to store a least a portion of the plurality of weights and to perform a hardware vector-matrix multiplication (VMM) for the portion of the plurality of weights stored by the CIM hardware module, the associated memory being coupled with the at least one compute engine, the profiling including at least one of:
  performing, on the learning network, at least one training iteration for the model using a particular training technique, the performing the at least one training iteration including propagating an activation through the plurality of weight layers and through the plurality of activation layers to provide an output and determining a weight update based upon the output, a target output, and the particular training technique, the propagating the activation through the plurality of weight layers including performing the hardware VMM by the CIM hardware module for each of the at least one compute engine; or
  determining a plurality of descriptors for the model executed using the at least one compute engine for selection, based on the plurality of descriptors, of at least a portion of a training technique from a library including a plurality of training techniques, the plurality of training techniques in the library being determined by executing the plurality of training techniques on at least an other compute engine that is analogous to the at least one compute engine based on the plurality of descriptors, the executing the plurality of training techniques on the at least the other compute engine including, for a selected training technique of the plurality of training techniques, propagating an other activation through an other plurality of weight layers and through an other plurality of activation layers to provide an other output and determining an other weight update based upon the other output, an other target output, and the selected training technique, the other plurality of weight layers including an other plurality of weights stored in a hardware compute engine of the at least the other compute engine; and
  determining, based on the profiling, the training technique for the model on the learning network, the determining including optimizing a latency for the at least one training iteration for a capacity of the associated memory; and
  wherein the training technique is used to update the plurality of weights stored in the CIM hardware module during training of the learning network.

2. The method of claim 1, wherein the particular training technique includes at least one of backpropagation, activation recomputation, partial activation recomputation, or feedback alignment.

3. The method of claim 2, wherein the performing the training iteration further includes:
  performing an inference using a training activation input;
  determining a loss function based on the inference;
  using the loss function and the particular training technique to determine a plurality of updates for the plurality of weights; and
  updating the plurality of weights.

4. The method of claim 3, wherein the using the loss function to determine the plurality of updates further includes:
  backpropagating the loss function through the plurality of layers.

5. The method of claim 1, wherein the capacity of the associated memory is less than a memory required for the training iteration, performing the training iteration further includes:

loading, from a remote memory, the activation for a weight layer of the plurality of weight layers;
  storing an output of the weight layer in the remote memory; and
  repeating the loading and storing for each subsequent weight layer of the plurality of weight layers.

6. The method of claim 1, wherein the profiling further includes:
  the determining the plurality of descriptors for the model; and
  based on the plurality of descriptors, selecting the at least a portion of the training technique from the library including the plurality of training techniques.

7. The method of claim 6, wherein the plurality of descriptors includes at least one of a batch size, a channel number, a width of an input activation, a height of the input activation, a stride, a padding size, a kernel size, a pooling size, or a dilation.

8. The method of claim 1, further comprising:
  performing the training of the learning network, the training including propagating a training activation through the plurality of weight layers and through the plurality of activation layers to provide a training output, determining a training weight update based upon the training output, a training target output, and the training technique, and updating the plurality of weights in the at least one compute engine using the training weight update
  wherein the training technique is used to update the plurality of weights stored in the CIM hardware module during training of the learning network.

9. The method of claim 1, wherein the training of the learning network does not exceed the capacity of the memory associated with the learning network.

10. A system, comprising:
  a memory; and
  a processor coupled to the memory and configured to:
    profile a model for a learning network having a plurality of layers and associated memory, the plurality of layers including a plurality of weight layers and a plurality of activation layers, the plurality of weight layers including a plurality of weights, the plurality of weight layers corresponding to at least one compute engine, each of the at least one compute engine including a compute-in-memory (CIM) hardware module, the CIM hardware module being configured to store a least a portion of the plurality of weights and to perform a hardware vector-matrix multiplication (VMM) of an input activation and the portion of the plurality of weights stored by the CIM hardware module, the associated memory being coupled with the at least one compute engine, wherein to profile the processor is further configured to at least one of
      manage performing, on the learning network, at least one training iteration for the model using a particular training technique using the at least one compute engine, the performing the at least one training iteration including propagating an activation through the plurality of weight layers and through the plurality of activation layers to provide an output and determining a weight update based upon the output, a target output, and the particular training technique, the propagating the activation through the plurality of weight layers including performing the hardware VMM by the CIM hardware module for each of the at least one compute engine, or or determine a plurality of descriptors for the model executed using the at least one compute engine based on the plurality of descriptors for selection, based on the plurality of descriptors, of at least a portion of a training technique from a library including a plurality of training techniques, the plurality of training techniques in the library being determined by executing the plurality of training techniques on at least an other compute engine that is analogous to the at least one compute engine based on the plurality of descriptors, the executing the plurality of training techniques on the at least the other compute engine including, for a selected training technique of the plurality of training techniques, propagating an other activation through an other plurality of weight layers and through an other plurality of activation layers to provide an other output and determining an other weight update based upon the other output, an other target output, and the selected training technique, the other plurality of weight layers including an other plurality of weights stored in a hardware compute engine of the at least the other compute engine; and determine, based on the profiling, the training technique for the model on the learning network, to determine, the processor being further configured to optimize a latency for the at least one training iteration for a capacity of the associated memory;

wherein the training technique is used to update the plurality of weights stored in the CIM hardware module during training of the learning network.

11. The system of claim 9, wherein the particular training technique includes at least one of backpropagation, activation recomputation, partial activation recomputation, or feedback alignment.

12. The system of claim 11, wherein the performing the at least one training iteration further includes the learning network:
performing an inference using a training activation input;
determining a loss function based on the inference;
using the loss function and the particular training technique to determine the weight update; and
updating the plurality of weights.

13. The system of claim 12, wherein the using the loss function to determine the plurality of updates further includes:
backpropagating the loss function through the plurality of layers.

14. The system of claim 9, wherein the capacity of the associated memory is less than a memory required for the training iteration, performing the training iteration further includes:
loading, from a remote memory, an activation for a weight layer of the plurality of weight layers;
storing an output of the weight layer in the remote memory; and
repeating the loading and storing for each subsequent weight layer of the plurality of weight layers.

15. The system of claim 10, wherein the processor being configured to profile further includes the processor being configured to:
determine a plurality of descriptors for the model; and
based on the plurality of descriptors, select at least a portion of the training technique from a library including a plurality of training techniques.

16. The system of claim 15, wherein the plurality of descriptors includes at least one of a batch size, a channel number, a width of an input activation, a height of the input activation, a stride, a padding size, a kernel size, a pooling size, or a dilation.

17. The system of claim 10, wherein the learning network includes at least one tile, each of the at least one tile including:
the at least one compute engine, each of the at least one compute engine including the compute-in-memory (CIM) hardware module, the portion of the plurality of weights corresponding to a matrix and the hardware VMM being for the matrix; and
a general-purpose (GP) processor coupled with the plurality of compute engines and configured to provide control instructions and data to the plurality of compute engines, the general-purpose processor corresponding to the plurality of activation layers.

18. The system of claim 17, wherein the GP processor is coupled with the plurality of compute engines via a streaming port and a control port, the control port configured to provide the plurality of compute engines with the control instructions and the streaming port being configured to exchange data between the GP processor and the plurality of compute engines.

19. The system of claim 17, wherein the CIM hardware module includes a plurality of storage cells for storing the plurality of weights.

20. A computer program product embodied in a non-transitory computer readable medium and comprising computer instructions for:
profiling a model for a learning network having a plurality of layers and associated memory, the plurality of layers including a plurality of weight layers and a plurality of activation layers, the plurality of weight layers including a plurality of weights, the plurality of weight layers corresponding to at least one compute engine, each of the at least one compute engine including a compute-in-memory (CIM) hardware module, the CIM hardware module being configured to store a least a portion of the plurality of weights and to perform a hardware vector-matrix multiplication (VMM) of an input activation and the portion of the plurality of weights stored by the CIM hardware module, the associated memory being coupled with the at least one compute engine, the computer instructions for profiling including computer instructions for at least one of:
performing, on the learning network, at least one training iteration for the model using a particular training technique, the performing the at least one training iteration including propagating an activation through the plurality of weight layers and through the plurality of activation layers to provide an output and determining a weight update based upon the output, a target output, and the particular training technique, the propagating the activation through the plurality of weight layers including performing the hardware VMM by the CIM hardware module for each of the at least one compute engine; or
determining a plurality of descriptors for the model executed using the at least one compute engine for selection, based on the plurality of descriptors, of at least a portion of a training technique from a library including a plurality of training techniques, the plurality of training techniques in the library being determined by executing the plurality of training techniques on at least an other compute engine that is analogous to the at least one compute engine
based on the plurality of descriptors, the executing the plurality of training techniques on the at least the other compute engine including, for a selected training technique of the plurality of training techniques, propagating an other activation through an other plurality of weight layers and through an other plurality of activation layers to provide an other output and determining an other weight update based upon the other output, an other target output, and the selected training technique, the other plurality of weight layers including an other plurality of weights stored in a hardware compute engine of the at least the other compute engine; and
determining, based on the profiling, the training technique for the model on the learning network, the determining including optimizing a latency for the at least one training iteration for a capacity of the associated memory;
wherein the training technique is used to update the plurality of weights stored in the CIM hardware module during training of the learning network.

* * * * *